US008584936B2

(12) United States Patent
Fiebiger et al.

(10) Patent No.: US 8,584,936 B2
(45) Date of Patent: Nov. 19, 2013

(54) TECHNIQUES FOR AUTHORIZATION OF USAGE OF A PAYMENT DEVICE

(75) Inventors: Sara Fiebiger, Ellisville, MO (US);
Adam Gluck, Ardsley, NY (US); Dennis J. Hill, St. Paul, MO (US); Carole Kelly-Frank, Wildwood, MO (US);
Arthur D. Kranzley, Pound Ridge, NY (US); Robert D. Reany, Wildwood, MO (US); Kenneth J. Mealey, Rye, NY (US)

(73) Assignee: Mastercard International Incorporated, Purchase, NY (US)

( * ) Notice: Subject to any disclaimer, the term of this patent is extended or adjusted under 35 U.S.C. 154(b) by 1138 days.

(21) Appl. No.: 11/897,577

(22) Filed: Aug. 31, 2007

(65) Prior Publication Data

US 2008/0033880 A1 Feb. 7, 2008

Related U.S. Application Data

(63) Continuation-in-part of application No. 11/626,408, filed on Jan. 24, 2007, now Pat. No. 7,828,204.

(60) Provisional application No. 60/764,106, filed on Feb. 1, 2006.

(51) Int. Cl.
*G06K 5/00* (2006.01)
(52) U.S. Cl.
USPC ................ 235/380; 235/379; 705/38; 705/44
(58) Field of Classification Search
USPC ........................................................ 235/280
See application file for complete search history.

(56) References Cited

U.S. PATENT DOCUMENTS

| 3,438,489 | A | 4/1969 | Cambornac et al. |
| 4,654,658 | A | 3/1987 | Walton |
| 4,849,613 | A | 7/1989 | Eisele |
| 4,891,503 | A | 1/1990 | Jewell et al. |
| 4,899,036 | A | 2/1990 | McCrindle et al. |
| 5,053,774 | A | 10/1991 | Schuermann et al. |
| 5,103,079 | A | 4/1992 | Barakai et al. |
| 5,191,193 | A | 3/1993 | Le Roux |

(Continued)

FOREIGN PATENT DOCUMENTS

| EP | 0 254 595 A2 | 1/1988 |
| GB | 2 267 626 A | 8/1993 |

(Continued)

OTHER PUBLICATIONS

"Hashing Credit Card Numbers" by Integrigy, Feb. 27, 2007 (16 pages).

(Continued)

*Primary Examiner* — Christopher Stanford
(74) *Attorney, Agent, or Firm* — Otterstedt, Ellenbogen & Kammer, LLP

(57) ABSTRACT

Techniques for authorization of usage of a payment device include facilitating an issuer of the device obtaining an authorization message for an account number associated with the device, based on desired spending limit parameters established by a merchant and/or an issuer of the device; facilitating obtaining an issuer authorization decision; and responsive to the issuer authorization decision, facilitating setting a spending limit for the account number based on at least an appropriate one of the parameters.

25 Claims, 13 Drawing Sheets

(56) References Cited

U.S. PATENT DOCUMENTS

| | | | |
|---|---|---|---|
| 5,285,382 A | 2/1994 | Muehleberger et al. | |
| 5,286,955 A | 2/1994 | Klosa | |
| 5,337,063 A | 8/1994 | Takahira | |
| 5,384,449 A | 1/1995 | Pierce | |
| 5,396,558 A | 3/1995 | Ishiguro et al. | |
| 5,449,894 A | 9/1995 | Bruhnke et al. | |
| 5,479,172 A | 12/1995 | Smith et al. | |
| 5,485,510 A | 1/1996 | Colbert | |
| 5,504,321 A | 4/1996 | Sheldon | |
| 5,679,938 A | 10/1997 | Templeton et al. | |
| 5,819,234 A * | 10/1998 | Slavin et al. | 340/10.4 |
| 5,826,241 A | 10/1998 | Stein et al. | |
| 5,828,044 A | 10/1998 | Jun et al. | |
| 5,917,913 A | 6/1999 | Wang | |
| 6,018,717 A | 1/2000 | Lee et al. | |
| 6,023,682 A | 2/2000 | Checchio | |
| 6,038,552 A | 3/2000 | Fleischl et al. | |
| 6,064,988 A | 5/2000 | Thomas | |
| 6,078,888 A | 6/2000 | Johnson, Jr. | |
| 6,116,505 A | 9/2000 | Withrow | |
| 6,154,778 A * | 11/2000 | Koistinen et al. | 709/228 |
| 6,182,894 B1 | 2/2001 | Hackett et al. | |
| 6,226,624 B1 | 5/2001 | Watson | |
| 6,394,341 B1 | 5/2002 | Makipaa et al. | |
| 6,422,460 B1 | 7/2002 | Boesch | |
| 6,480,101 B1 | 11/2002 | Kelly et al. | |
| 6,554,183 B1 | 4/2003 | Sticha et al. | |
| 6,651,885 B1 | 11/2003 | Arias | |
| 6,655,587 B2 * | 12/2003 | Andrews et al. | 235/383 |
| 6,675,153 B1 | 1/2004 | Cook et al. | |
| 6,701,303 B1 | 3/2004 | Dunn et al. | |
| 6,732,922 B2 | 5/2004 | Lindgren et al. | |
| 6,749,114 B2 | 6/2004 | Madani | |
| 6,848,613 B2 | 2/2005 | Nielson et al. | |
| 6,850,916 B1 | 2/2005 | Wang | |
| 6,853,987 B1 | 2/2005 | Cook | |
| 6,923,371 B2 | 8/2005 | Goodfellow | |
| 6,931,382 B2 | 8/2005 | Laage et al. | |
| 6,934,849 B2 | 8/2005 | Kramer et al. | |
| 6,999,944 B1 | 2/2006 | Cook | |
| 7,003,495 B1 | 2/2006 | Burger et al. | |
| 7,021,532 B2 | 4/2006 | Robinson et al. | |
| 7,039,611 B2 | 5/2006 | Devine | |
| 7,566,003 B2 | 7/2009 | Silbernagl et al. | |
| 7,568,617 B2 | 8/2009 | Silbernagl et al. | |
| 7,828,204 B2 | 11/2010 | Fiebiger et al. | |
| 2001/0029494 A1 | 10/2001 | Tomita | |
| 2002/0032661 A1 | 3/2002 | Schuba et al. | |
| 2002/0124184 A1 | 9/2002 | Fichadia et al. | |
| 2002/0138445 A1 | 9/2002 | Laage et al. | |
| 2002/0156745 A1 | 10/2002 | Tallent et al. | |
| 2002/0161729 A1 | 10/2002 | Andrews | |
| 2002/0170959 A1 | 11/2002 | Madani | |
| 2002/0174013 A1 | 11/2002 | Freeman et al. | |
| 2003/0055786 A1 | 3/2003 | Smith, Jr. et al. | |
| 2003/0061163 A1 | 3/2003 | Durfield | |
| 2003/0074317 A1 | 4/2003 | Hofi | |
| 2003/0088777 A1 | 5/2003 | Bae et al. | |
| 2003/0101096 A1 | 5/2003 | Suzuki | |
| 2003/0101137 A1 | 5/2003 | Wronski | |
| 2004/0039694 A1 | 2/2004 | Dunn et al. | |
| 2004/0128258 A1 | 7/2004 | Su | |
| 2004/0153396 A1 | 8/2004 | Hinderer | |
| 2004/0230535 A1 | 11/2004 | Binder | |
| 2004/0243510 A1 * | 12/2004 | Hinderer et al. | 705/38 |
| 2005/0044039 A1 | 2/2005 | Greer et al. | |
| 2005/0131826 A1 | 6/2005 | Cook | |
| 2005/0149455 A1 | 7/2005 | Bruesewitz et al. | |
| 2005/0184145 A1 | 8/2005 | Law et al. | |
| 2005/0216405 A1 | 9/2005 | So | |
| 2005/0262026 A1 | 11/2005 | Watkins | |
| 2005/0269398 A1 | 12/2005 | Robinson et al. | |
| 2006/0031161 A1 | 2/2006 | D'Agostino | |
| 2006/0278704 A1 | 12/2006 | Saunders et al. | |
| 2007/0168260 A1 | 7/2007 | Cunescu | |
| 2008/0033880 A1 | 2/2008 | Fiebiger et al. | |
| 2008/0156873 A1 | 7/2008 | Wilhelm et al. | |
| 2011/0017820 A1 | 1/2011 | Fiebiger et al. | |

FOREIGN PATENT DOCUMENTS

| | | |
|---|---|---|
| JP | 06-215009 | 8/1994 |
| JP | 07-262455 | 10/1995 |
| JP | 2003-067484 | 3/2003 |
| JP | 2006-244227 | 9/2006 |
| WO | WO 94/22115 | 9/1994 |
| WO | WO 97/00501 | 1/1997 |
| WO | WO00/02150 | 1/2000 |
| WO | WO01/43095 | 6/2001 |
| WO | WO 2006/124808 A2 | 11/2006 |
| WO | WO 2006/124808 A3 | 11/2006 |
| WO | WO 2007/090027 A2 | 8/2007 |

OTHER PUBLICATIONS

"Hash Function" by Wikipedia, downloaded from http://en.wikipedia.org/wiki/Hash_function on Oct. 22, 2009 (9 pages).

"Payment Card Industry (PCI) Data Security Standard (DSS) and Payment Application Data Security Standard (PA-DSS) Glossary", Ver. 1.2, Oct. 2008 (14 pages).

"Skiers now can pay for bus ride with a 'blink'" by Nicole Warburton of Deseret Morning News, Dec. 7, 2006 (2 pages).

"ISO/IEC 4909: Identification cards—Financial transaction cards—Magnetic stripe data content for track 3", First edition, Jul. 1, 2006 (21 pages).

"ISO/IEC 7812-1: Identification cards—Identification of issuers—Part 1: Numbering system", Second Edition, Sep. 15, 2000 (11 pages).

"ISO/IEC 7813: Information technology—Identification cards—Financial transaction cards", Sixth edition, Jul. 1, 2006 (12 pages).

"ISO/IEC 7816-5: Identification cards—Integrated circuit cards—Part 5: Registration of application providers", Second edition, Dec. 1, 2004 (13 pages).

"ISO/IEC 7816-6: Identification cards—Integrated circuit cards—Part 6: Interindustry data elements for interchange" Second edition May 15, 2004 (26 pages).

Bistrich, Austrian Patent Office, International Search Report for International Application No. PCT/KR96/00061, dated Jul. 29, 1996, 6 pages, Vienna, Austria.

"Query data faster using sorted hash clusters" by Scott Stephens, Jul. 27, 2005, downloaded May 21, 2009 (1 page).

"ISO/IEC 7816-4: Identification cards-Integrated circuit cards—Part 4: Organization, security and commands for interchange", Second edition, Jan. 15, 2005 (90 pages).

Intellectual Property Office of the Republic of China (Taiwan), Office Action Dated Jun. 13, 2013, application No. 096103369, with English Translation.

* cited by examiner

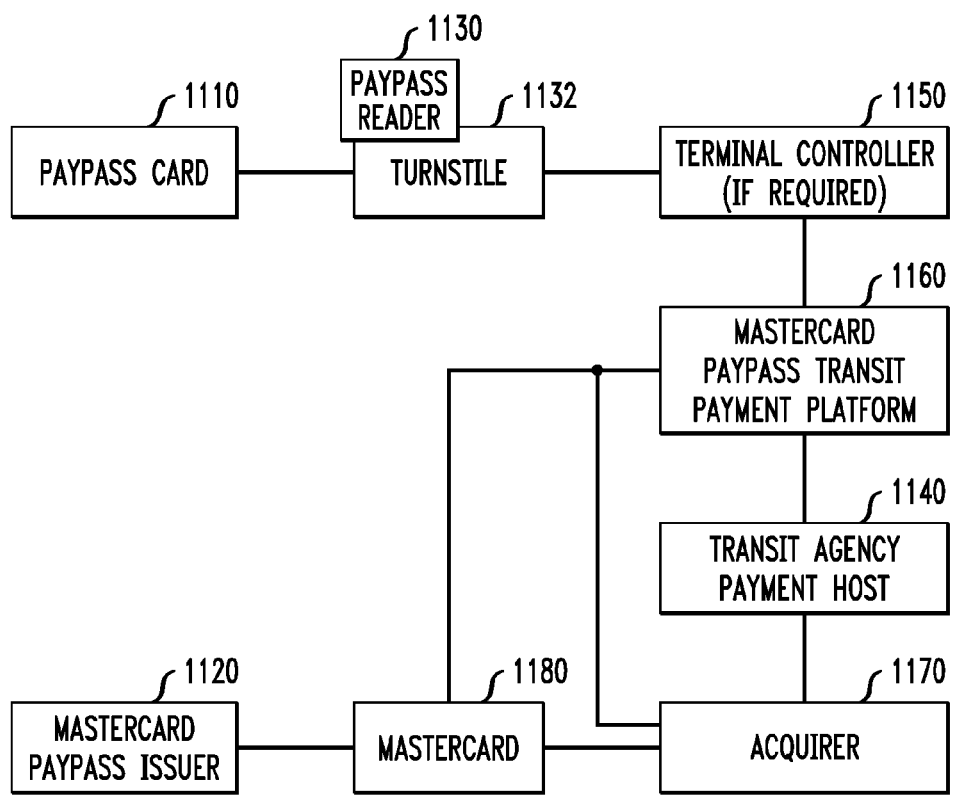

FIG. 8

HOST PLUS DISTRIBUTED NEGATIVE FILE IMPLEMENTATION

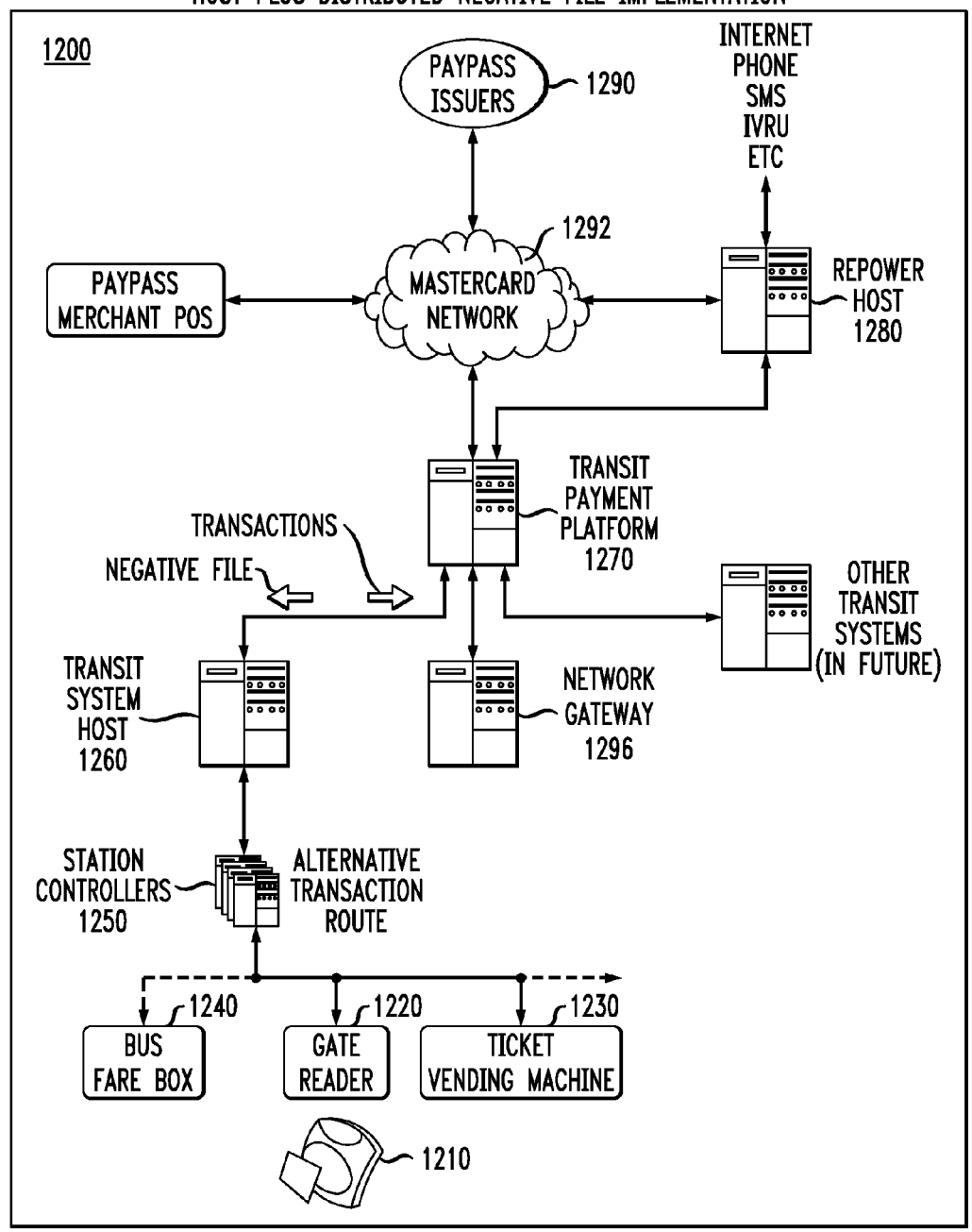

PAYPASS FOR TRANSIT ARCHITECTURE OVERVIEW

THE MAIN COMPONENTS ARE BRIEFLY DESCRIBED BELOW:
- PAYPASS CARD/DEVICE. ISO 14443 SMART CARD OR OTHER DEVICE (e.g. KEY FOB) CONTAINING THE MASTERCARD PAYPASS APPLICATION
- GATE READER. EXISTING GATE WITH ADDITION OF ISO 14443 CARD READER AND PAYPASS TERMINAL APPLICATION
- TICKET VENDING MACHINE. EXISTING TICKETING MACHINE

REGISTRATION PROCESS

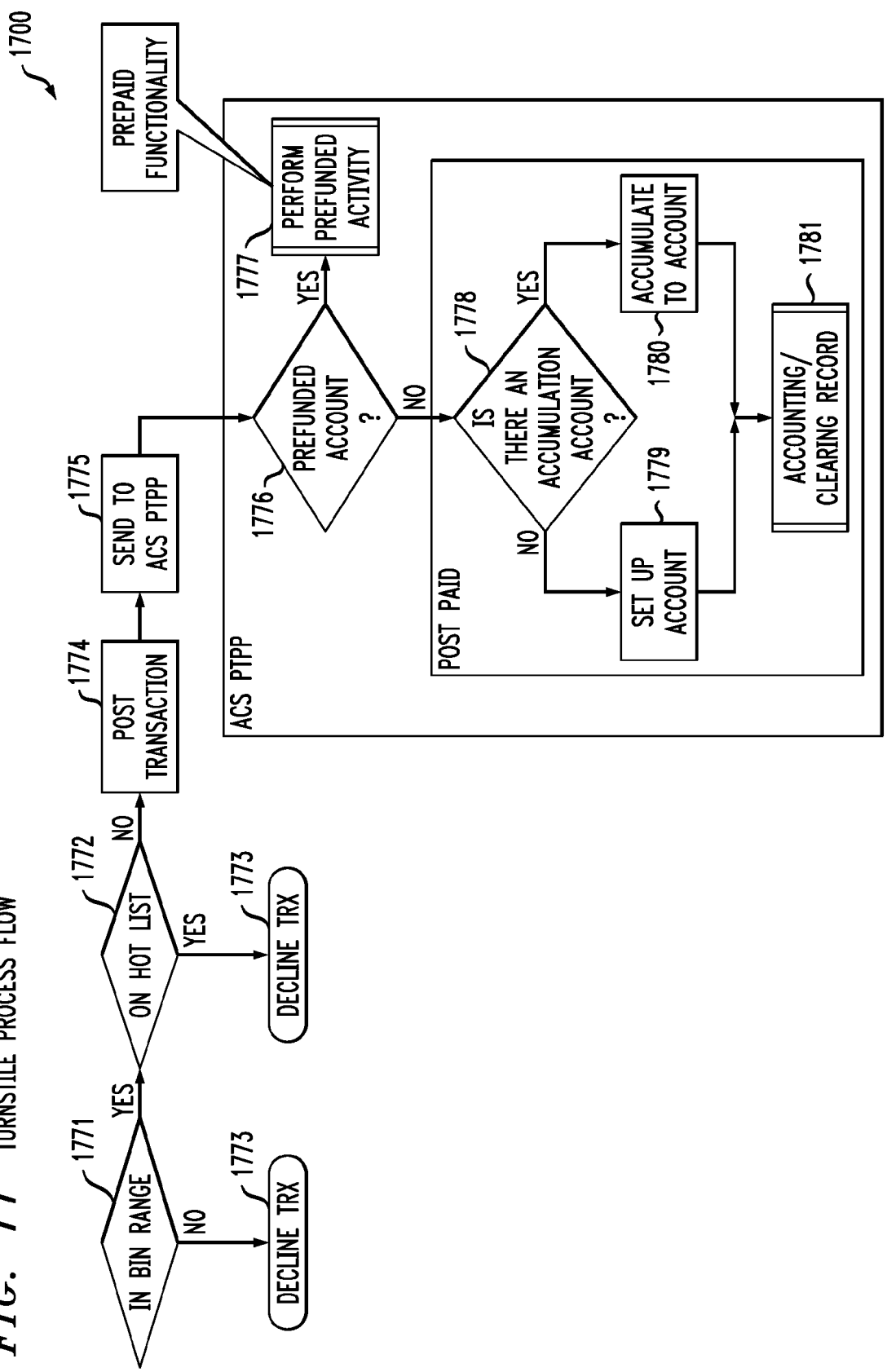
FIG. 11  TURNSTILE PROCESS FLOW

FIG. 12A

PAYPASS TRANSIT CARD PROCESSING PROCEDURE – 1300

TABLE 1 – PART 1

| | | |
|---|---|---|
| 1310 — GATE PROCESS | | |
| 1311 — • MASTERCARD PAYPASS CARD READ AT GATE | | |
| 1312 — TRANSACTION WILL BE DECLINED IF THE CARD IS ON THE NEGATIVE FILE, OTHERWISE GATE WILL BE OPENED. | | |
| 1320 — TRANSIT PAYMENT PLATFORM PROCESS | | |
| 1321 — HOST WILL DETERMINE IF AN UNREGISTERED OR A REGISTERED CARD | | |
| TYPE OF FARE | UNREGISTERED CARD | REGISTERED CARD |
| SINGLE RIDE | 1322 — PAYMENT WILL BE OBTAINED FROM A MASTERCARD CREDIT OR DEBIT ACCOUNT<br><br>1322a — • PAYMENT AUTHORIZATION PERFORMED ASYNCHRONOUSLY (i.e. AT A LATER TIME THAN CARD PRESENTMENT)<br><br>1322b — • IF PAYMENT AUTHORIZATION DECLINED, THE CARD WILL BE ADDED TO THE NEGATIVE FILE<br><br>1322c — • IF PAYMENT AUTHORIZATION OK, THEN PAYMENT PROCESSED VIA ACQUIRER<br><br>1322d — • PAYMENT DEDUCTED FROM CARDHOLDER'S MASTERCARD ACCOUNT BY THE CARD ISSUER (CREDIT, DEBIT)<br><br>1322e — • AGGREGATION OF TRANSACTIONS (FOR EXAMPLE, BY RIDER OR ACCOUNT HOLDER) ON A PERIODIC BASIS TO ENHANCE SYSTEM FUNCTIONALITY IS AN OPTION | NOT APPLICABLE |
| | | |

FIG. 12B

TABLE 1 – PART 2

| | | | |
|---|---|---|---|
| VALUE BASED (PAY-PER-RIDE) | NOT APPLICABLE | 1323<br>1323a<br>1323b<br>1323c | PAYMENT WILL BE OBTAINED FROM THE CARDHOLDER'S TRANSIT PAYMENT PLATFORM ACCOUNT<br>• PAYMENT CHECK PERFORMED ASYNCHRONOUSLY (i.e.: AT A LATER TIME THAN CARD PRESENTMENT)<br>• IF PAYMENT DECLINED (e.g. BECAUSE OF INSUFFICIENT FUNDS IN THE CARDHOLDER'S TRANSIT PRE-FUNDED ACCOUNT), THE CARD WILL BE ADDED TO THE NEGATIVE FILE<br>• OTHERWISE PAYMENT DEDUCTED FROM CARDHOLDER'S TRANSIT PAYMENT PLATFORM ACCOUNT |
| TIME BASED (UNLIMITED RIDE) | NOT APPLICABLE | 1324<br>1324a<br>1324b | RIDE WILL BE CHECKED AGAINST CARDHOLDER'S ENTITLEMENT STORED ON TRANSIT PAYMENT PLATFORM ACCOUNT<br>• RIDE ENTITLEMENT CHECK PERFORMED ASYNCHRONOUSLY (i.e.: AT A LATER TIME THAN CARD PRESENTMENT)<br>• IF RIDE ENTITLEMENT DECLINED (e.g. BECAUSE THE UNLIMITED RIDE PERIOD HAS EXPIRED), THE CARD WILL BE ADDED TO THE NEGATIVE FILE (NOTE IF THE CARDHOLDER HAS SELECTED "AUTO-LOAD" ON REPOWER, THEN THEIR ENTITLEMENT WILL AUTOMATICALLY BE RENEWED PRIOR TO EXPIRY) |

FIG. 13

TABLE - POSSIBLE TYPES OF CARD AND TRANSIT PAYMENTS SUPPORTED
APPENDIX B

| | PAYPASS<br>MASTERCARD<br>MASTERCARD PAYPASS<br>BANK PAYPASS CARD CREDIT OR DEBIT | PAYPASS<br>MASTERCARD METROCARD<br>MTA METROCARD/ MASTERCARD PAYPASS<br>BANK/MTA CO-BRAND PAYPASS CARD CREDIT OR DEBIT | POWERED BY PAYPASS<br>METROCARD<br>MTA PRIVATE LABEL PREPAID CARD POWERED BY PAYPASS<br>MTA PAYPASS CARD² PREPAID 'PRIVATE LABEL' | |
|---|---|---|---|---|
| | UNREGISTERED | REGISTERED | REGISTERED | REGISTERED |
| SINGLE RIDE – FULL FARE | Y¹ | N | N | N |
| SINGLE RIDE – REDUCED FARE | N | N | N | N |
| PAY-PER-RIDE³ (VALUE BASED) – FULL FARE | N | Y | Y | Y |
| PAY-PER-RIDE³ (VALUE BASED) – REDUCED FARE | N | Y | Y | Y |
| UNLIMITED RIDE³ (TIME BASED) | N | Y | Y | Y |
| USE OUTSIDE MTA AT MASTERCARD MERCHANTS | Y | | Y | N |
| USAGE | NAMED ACCOUNT HOLDER ONLY | | NAMED ACCOUNT HOLDER ONLY | NAMED ACCOUNT HOLDER (? ALLOW USE BY ANYONE WITH ACCOUNT HOLDER'S PERMISSION ?) |
| NOTES TO TABLE | 1. UNREGISTERED CARDS MAY PERFORM A LIMITED NUMBER OF SINGLE RIDES PER MONTH. ONCE THE LIMIT IS REACHED, REGISTRATION MAY BE REQUIRED<br>2. MTA PAYPASS CARDS MAY BE ISSUED ON BEHALF OF THE MTA BY A PARTNER e.g. MASTERCARD BANK<br>3. PAY-PER-RIDE AND UNLIMITED RIDE FUNCTIONALITY IS SUPPORTED BY A TRANSIT PAYMENTS HOST SYSTEM PLATFORM | | | |

TECHNIQUES FOR AUTHORIZATION OF USAGE OF A PAYMENT DEVICE

CROSS-REFERENCE TO RELATED APPLICATIONS

This patent application is a continuation-in-part of U.S. patent application Ser. No. 11/626,408 filed Jan. 24, 2007, now U.S. Pat. No. 7,828,204 which claims the benefit of U.S. Provisional Patent Application Ser. No. 60/764,106 filed on Feb. 1, 2006 and entitled "Techniques for Authorization in Low Cost, High Volume Environments." The disclosures of the aforementioned Provisional Patent Application Ser. No. 60/764,106 and U.S. patent application Ser. No. 11/626,408 filed Jan. 24, 2007 are expressly incorporated herein by reference in their entirety for all purposes.

FIELD OF THE INVENTION

The present invention relates generally to electronic commerce, and, more particularly, to electronic payment systems.

BACKGROUND OF THE INVENTION

There is an interest in employing cash alternatives in a variety of environments. Such cash alternatives can include, for example, payment devices such as payment cards and the like. In some cases, it may be difficult to employ such cash alternatives where transaction processing times are too long, for example, due to slow terminal decisioning. One non-limiting example of a situation where transaction times might need to be short is the case of high volume environments (for example, access to transit systems). Such high volume environments might also tend to involve relatively low-value transactions. Current techniques are unable to implement the traditional authorization decisioning process to the issuer and receive a response in real-time.

For example, U.S. Pat. No. 5,828,044 of Jun et al. discloses a non-contacting type radio frequency recognizing credit card system. The Jun et al. system includes: an RF card for being activated by receiving radio frequency from a card terminal (70) so as to transmit its own card number to the card terminal through radio frequency; the card terminal radiating a radio frequency to induce an electric generation in the RF card, and the card terminal transmitting a card number data (received through a radio frequency) to a wire-connected terminal computer; and the terminal computer reading the card number data from the card terminal to make an inquiry into a black list, to make a decision for issuing an approval of a transaction or a denying of the transaction, and to transmit the result of the decision to the card terminal.

U.S. Pat. No. 4,891,503 of Jewell discloses a distributed authorization system. The distributed authorization system and process for authorizing transactions utilizes a host computer communicating with a network of electronic terminals remote from the host computer. It includes storing negative file data in the electronic terminal containing information used to identify accounts for which requested transactions are to be denied, and storing authorization file data in the electronic terminal containing information used to determine whether to authorize a requested transaction. Upon entry of a transaction request, the data is checked against the terminal negative file data and immediately denied if the card account is contained in the terminal's negative file. If the transaction is not denied, authorization logic is performed in the electronic terminal resulting in terminal output denying the request, authorizing the request, or establishing an electronic connection from the terminal to the host computer to obtain authorization from the host computer. In establishing this connection, account data is transmitted from the host back to the remote electronic terminal resulting in terminal output either denying the request or authorizing the request. Also, during such connection, the terminal's authorization file is updated with account data, transmitted from the host computer to the electronic terminal. The completed transaction is stored in a terminal transaction queue file residing in the terminal for subsequent transmission to the host computer, and for use with a transaction request is subsequently entered at the terminal for the same account.

U.S. Pat. No. 5,285,382 of Muehlberger et al. discloses a system and method for processing credit and debit card validity and funds transactions from vending machines and similar terminals, including a data processor with memory storage capable of accessing an electronic clearing facility through a time rated (e.g., long distance) communication link. The system generates a real-time communication with the clearing facility to determine card validity and to initiate funds collection for transactions above a predetermined amount, and generates an off-line batch communication to the clearing facility at a time when communication rates are reduced to initiate funds collection for transactions in the system below the predetermined amount. The system relies upon local card validation, including memory storage of a previously validated card during a predetermined time period, as well as rejection of previously invalidated cards during another predetermined time period. The system and method is particularly useful for remote automated vending machines and automatic teller machines which typically handle a large volume of credit and debit transactions, each of which represents a small dollar amount.

A need exists for improvement in known techniques.

SUMMARY OF THE INVENTION

Principles of the present invention provide techniques for authorization of usage of a payment device. The payment device could be used, for example, at a merchant (broadly understood to include any entity providing products and/or services or acting for such an entity). The payment device can have an associated account number. In one or more embodiments, authorization can be conducted effectively, yet sufficiently quickly, even for relatively low cost and/or high volume environments, such as transit systems and the like. An exemplary embodiment of a method (which can be computer-implemented), according to one aspect of the invention, for such authorization, includes the steps of facilitating an issuer of the device obtaining an authorization message for the account number, based on desired spending limit parameters established by at least one of the merchant and the issuer; facilitating obtaining an issuer authorization decision; and responsive to the issuer authorization decision, facilitating setting a spending limit for the account number based on at least an appropriate one of the parameters. The spending limit parameters could include, for example, an aggregation limit for a post-funded payment device and/or a decrementing limit for a pre-funded payment device. In some instances, other fare types (e.g. time based, transfers, special class, and the like) can be accommodated, and can be funded on either a pre or post basis.

An exemplary embodiment of an apparatus for authorization of usage of a payment device at a merchant, according to another aspect of the invention, includes a memory and at least one processor coupled to the memory. The processor can be operative to perform one or more method steps as described herein. In one or more embodiments, the apparatus is an active file manager.

Further, one or more method steps of the present invention can be implemented in the form of an article of manufacture comprising a machine readable medium that contains one or more programs which when executed implement such step(s).

One or more embodiments of the invention can provide substantial beneficial technical effects; for example, providing rapid decisions regarding approving or declining, in a time averaging less than 200 milliseconds (ms), with a high degree of decision accuracy. The 200 ms time is provided by way of example and illustration, and is not intended to be limiting. Further, in one or more embodiments of the invention, the benefits of the rapid decision response can be achieved while still maintaining the benefits of robust authorization processing by a payment processing network operator, along with the issuer's own authorization processing. The processing can include, by way of example and not limitation, risk analysis, restricted and delinquent card checks, card validation code checks, and open-to-buy verification.

These and other features and advantages of the present invention will become apparent from the following detailed description of illustrative embodiments thereof, which is to be read in connection with the accompanying drawings.

BRIEF DESCRIPTION OF THE DRAWINGS

FIGS. 7-11 are renumbered reproductions of FIGS. 1-5 of World Intellectual Property Organization (WIPO) International Publication Number WO2006/124808;

FIGS. 12A and B are reproductions of Table 1 of the aforesaid WIPO publication; and FIG. 13 is a reproduction of Appendix B of the aforesaid WIPO publication.

DETAILED DESCRIPTION OF PREFERRED EMBODIMENTS

Figure 1:
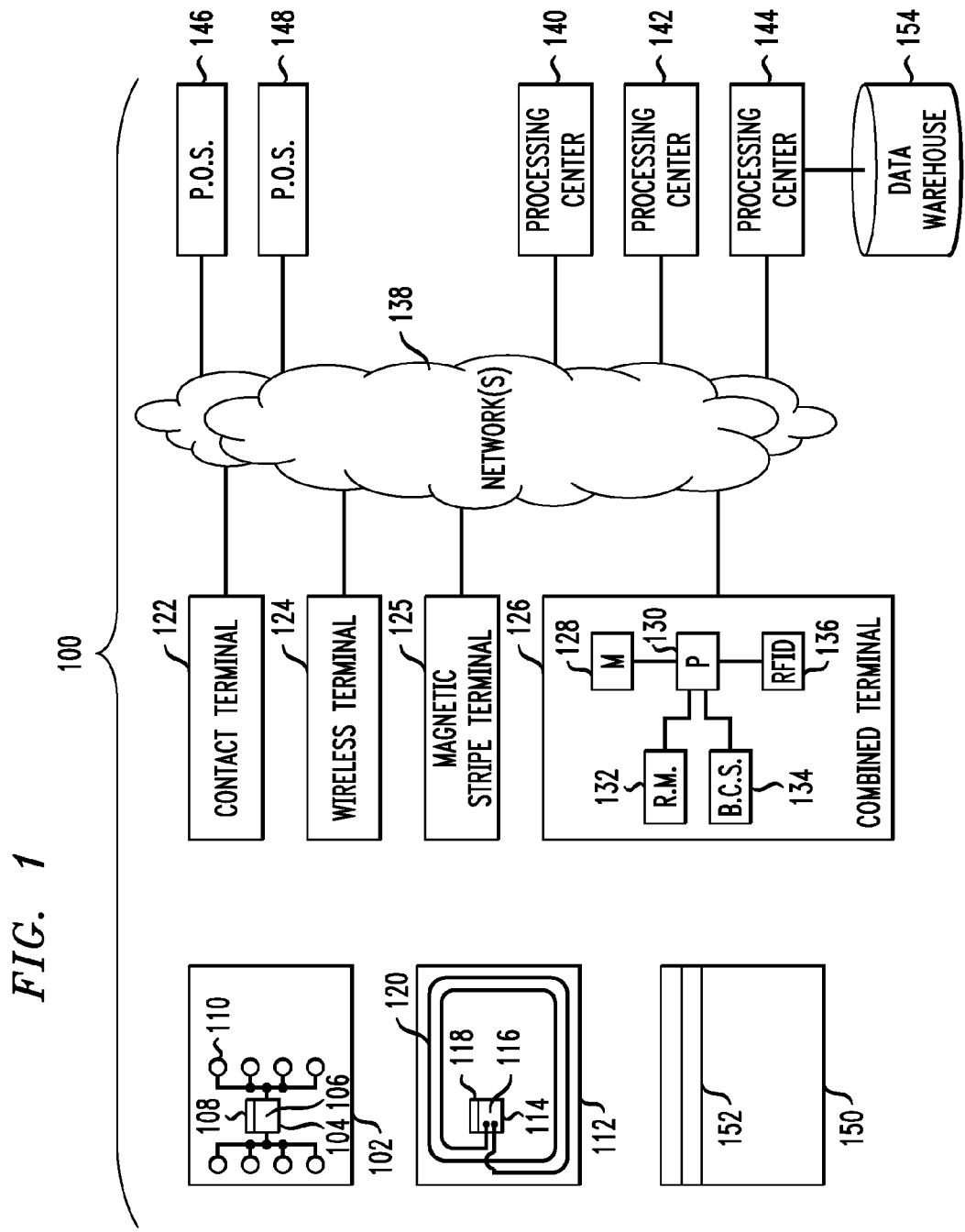
FIG. 1 shows an example of a system that can implement techniques of the present invention.

Attention should now be given to FIG. 1, which depicts an exemplary embodiment of a system 100, according to an aspect of the present invention, and including various possible components of the system. System 100 can include one or more different types of portable payment devices. For example, one such device can be a contact device such as card 102. Card 102 can include an integrated circuit (IC) chip 104 having a processor portion 106 and a memory portion 108. A plurality of electrical contacts 110 can be provided for communication purposes. In addition to or instead of card 102, system 100 can also be designed to work with a contactless device such as card 112. Card 112 can include an IC chip 114 having a processor portion 116 and a memory portion 118. An antenna 120 can be provided for contactless communication, such as, for example, using radio frequency (RF) electromagnetic waves. An oscillator or oscillators, and/or additional appropriate circuitry for one or more of modulation, demodulation, downconversion, and the like can be provided. Note that cards 102, 112 are exemplary of a variety of devices that can be employed with techniques of the present invention. Other types of devices could include a conventional card 150 having a magnetic stripe 152, an appropriately configured cellular telephone handset, and the like. Indeed, techniques of the present invention can be adapted to a variety of different types of cards, terminals, and other devices.

The ICs 104, 114 can contain processing units 106, 116 and memory units 108, 118. Preferably, the ICs 104, 114 can also include one or more of control logic, a timer, and input/output ports. Such elements are well known in the IC art and are not separately illustrated. One or both of the ICs 104, 114 can also include a co-processor, again, well-known and not separately illustrated. The control logic can provide, in conjunction with processing units 106, 116, the control necessary to handle communications between memory unit 108, 118 and the input/output ports. The timer can provide a timing reference signal from processing units 106, 116 and the control logic. The co-processor could provide the ability to perform complex computations in real time, such as those required by cryptographic algorithms.

The memory portions or units 108, 118 may include different types of memory, such as volatile and non-volatile memory and read-only and programmable memory. The memory units can store transaction card data such as, e.g., a user's primary account number ("PAN") and/or personal identification number ("PIN"). The memory portions or units 108, 118 can store the operating system of the cards 102, 112. The operating system loads and executes applications and provides file management or other basic card services to the applications. One operating system that can be used to implement the present invention is the MULTOS® operating system licensed by StepNexus Inc. Alternatively, JAVA CARD™-based operating systems, based on JAVA CARD™ technology (licensed by Sun Microsystems, Inc., 4150 Network Circle, Santa Clara, Calif. 95054 USA), or proprietary operating systems available from a number of vendors, could be employed. Preferably, the operating system is stored in read-only memory ("ROM") within memory portion 108, 118. In an alternate embodiment, flash memory or other non-volatile and/or volatile types of memory may also be used in the memory units 108, 118.

In addition to the basic services provided by the operating system, memory portions 108, 118 may also include one or more applications. At present, one possible standard to which such applications may conform is the EMV payment standard set forth by EMVCo, LLC (http://www.emvco.com). It will be appreciated that, strictly speaking, the EMV standard defines the behavior of a terminal; however, the card can be configured to conform to such EMV-compliant terminal behavior and in this sense is itself EMV-compliant. It will also be appreciated that applications in accordance with the present invention can be configured in a variety of different ways.

As noted, cards 102, 112 are examples of a variety of payment devices that can be employed with techniques of the present invention. The primary function of the payment devices may not be payment, for example, they may be cellular phone handsets that implement techniques of the present invention. Such devices could include cards having a conventional form factor, smaller or larger cards, cards of different shape, key fobs, personal digital assistants (PDAs), appropriately configured cell phone handsets, or indeed any device with the capabilities to implement techniques of the present invention. The cards, or other payment devices, can include body portions (e.g., laminated plastic layers of a payment card, case or cabinet of a PDA, chip packaging, and the like), memories 108, 118 associated with the body portions, and processors 106, 116 associated with the body portions and coupled to the memories. The memories 108, 118 can contain appropriate applications. The processors 106, 116 can be operative to execute one or more method steps. The applications can be, for example, application identifiers (AIDs) linked to software code in the form of firmware plus data in a card memory such as an electrically erasable programmable read-only memory (EEPROM). Again, note that "smart" cards are not necessarily required and a conventional magnetic stripe card can be employed.

A number of different types of terminals can be employed with system 100. Such terminals can include a contact terminal 122 configured to interface with contact-type device 102, a wireless terminal 124 configured to interface with wireless device 112, a magnetic stripe terminal 125 configured to interface with a magnetic stripe device 150, or a combined terminal 126. Combined terminal 126 is designed to interface with any type of device 102, 112, 150. Some terminals can be contact terminals with plug-in contactless readers. Combined terminal 126 can include a memory 128, a processor portion 130, a reader module 132, and optionally an item interface module such as a bar code scanner 134 and/or a radio frequency identification (RFID) tag reader 136. Items 128, 132, 134, 136 can be coupled to the processor 130. Note that the principles of construction of terminal 126 are applicable to other types of terminals and are described in detail for illustrative purposes. Reader module 132 can be configured for contact communication with card or device 102, contactless communication with card or device 112, reading of magnetic stripe 152, or a combination of any two or more of the foregoing (different types of readers can be provided to interact with different types of cards e.g., contacted, magnetic stripe, or contactless). Terminals 122, 124, 125, 126 can be connected to one or more processing centers 140, 142, 144 via a computer network 138. Network 138 could include, for example, the Internet, or a proprietary network. More than one network could be employed to connect different elements of the system. Processing centers 140, 142, 144 can include, for example, a host computer of an issuer of a payment device. Further details regarding one specific form of network will be provided below.

Many different retail or other establishments, represented by points-of-sale 146, 148, can be connected to network 138. In one or more embodiments of the invention, it is believed preferable that various establishments interface with a telecommunications network, such as a virtual private network (VPN), via one or more machines which are then connected to the network. This will be discussed further below. Each such establishment can have one or more terminals. Further, different types of portable payment devices, terminals, or other elements or components can combine or "mix and match" one or more features depicted on the exemplary devices in FIG. 1.

Portable payment devices can facilitate transactions by a user with a terminal, such as 122, 124, 125, 126, of a system such as system 100. Such a device can include a processor, for example, the processing units 106, 116 discussed above. The device can also include a memory, such as memory portions 108, 118 discussed above, that is coupled to the processor. Further, the device can include a communications module that is coupled to the processor and configured to interface with a terminal such as one of the terminals 122, 124, 125, 126. The communications module can include, for example, the contacts 110 or antennas 120 together with appropriate circuitry (such as the aforementioned oscillator or oscillators and related circuitry) that permits interfacing with the terminals via contact or wireless communication. The processor of the apparatus can be operable to perform one or more steps of methods and techniques. The processor can perform such operations via hardware techniques, and/or under the influence of program instructions, such as an application, stored in one of the memory units.

The portable device can include a body portion. For example, this could be a laminated plastic body (as discussed above) in the case of "smart" cards 102, 112, or the handset chassis and body in the case of a cellular telephone.

It will be appreciated that the terminals 122, 124, 125, 126 are examples of terminal apparatuses for interacting with a payment device of a holder in accordance with one or more exemplary embodiments of the present invention. The apparatus can include a processor such as processor 130, a memory such as memory 128 that is coupled to the processor, and a communications module such as 132 that is coupled to the processor and configured to interface with the portable apparatuses 102, 112, 142. The processor 130 can be operable to communicate with portable payment devices of a user via the communications module 132. The terminal apparatuses can function via hardware techniques in processor 130, or by program instructions stored in memory 128. Such logic could optionally be provided from a central location such as processing center 140 over network 138. The aforementioned bar code scanner 134 and/or RFID tag reader 136 can be provided, and can be coupled to the processor, to gather attribute data, such as a product identification, from a UPC code or RFID tag on a product to be purchased. In some environments, such as, e.g., a transit system with a fixed fare, items 134 and 136 are not needed, since, e.g., only one item can be purchased (the fixed-fare ride), or identification can occur via other means.

The above-described devices 102, 112 can be ISO 7816-compliant contact cards or devices or ISO 14443-compliant proximity cards or devices. In operation, card 112 can be touched or tapped on the terminal 124 or 128, which then contactlessly transmits the electronic data to the proximity IC chip in the card 112 or other wireless device.

One or more of the processing centers 140, 142, 144 can include a database such as a data warehouse 154.

Figure 2:
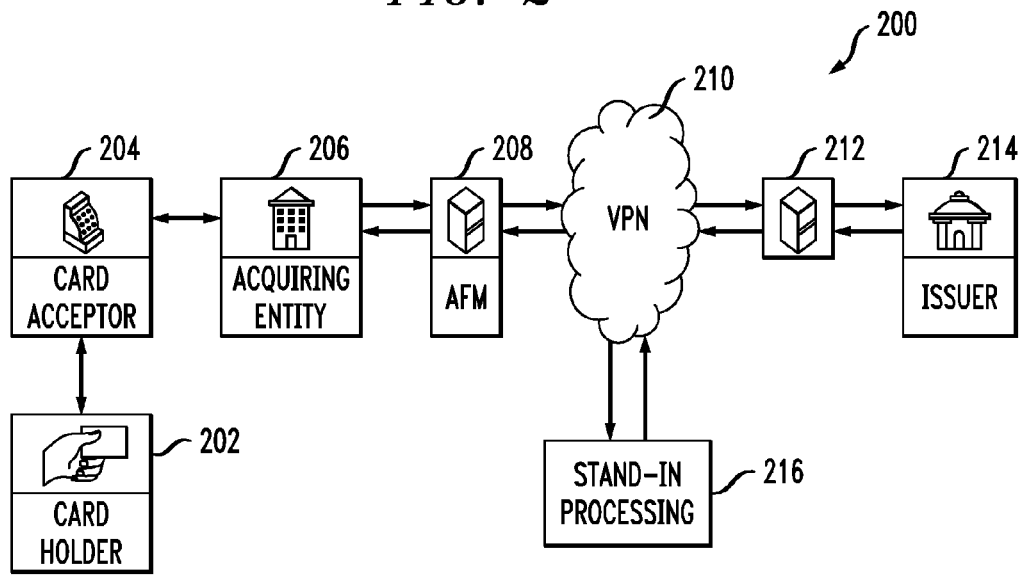
FIG. 2 shows initial and periodic "standard" authorization flow according to an exemplary embodiment of the present invention.

Attention should now be given to FIG. 2, which is a block diagram 200 of one possible specific exemplary embodiment of the present invention, also depicting (via the arrows) initial and periodic authorization flow according to the exemplary embodiment. In one or more embodiments of the invention, including the exemplary embodiment shown in FIG. 2, the authorization flow is a "standard" authorization flow, in the sense that the flow per se is commonly recognized, or commonly accepted: the request originates from the merchant and/or acquiring entity, and traverses the payment network (in this case a VPN 210 to be discussed below) to the issuer. The issuer 214 then sends a response (or a stand-in processor 216 sends it on behalf of the issuer) back through the payment network, to the merchant and/or acquiring entity. The terminology "standard" should not be taken as implying that the inventive use and contents of the message(s) as described herein (for example, the inventive setting of the spending limit) are taught or suggested in any prior techniques.

As shown at 202, the holder of a card or other payment device interacts with a terminal at a facility of a card acceptor 204, corresponding, e.g., to terminals and points of sale as described with respect to FIG. 1. The card acceptor sends transaction information to an acquiring entity 206, for example, via a network such as described in FIG. 1. By way of example and not limitation, an acquiring entity could include an acquirer or other entity responsible for the acquired transaction, whether they are referred to in common use by artisans skilled in the electronic payment arts as an "acquirer" or an "acquiring processor," and the like (the acquiring entity can also be referred to as a consolidator). An active file manager (AFM) 208 can be provided between acquiring entity 206 and a telecommunications network such as VPN 210 (which can be, for example, a payment processing network). Manager 208 can be located in a variety of places, e.g., at the acquiring entity's facility, and could be operated by, e.g., an acquirer. Further, manager 208 could reside on the same machine as a conventional front end communications processor such as a MASTERCARD INTERFACE PROCESSOR™ or MIP™ processor (trademarks of MasterCard International, Inc. of Purchase, N.Y.), or could reside on a separate machine interfacing with such a conventional front end processor, which then interfaced with network 210. In summary, manager 208 should be connected to network 210 for authorization processing, but as noted, can be located in a variety of places.

Another conventional front-end communications processor 212, such as a MIP™ processor, can be located, e.g., at the facility of an issuer 214 to provide access to the aforementioned VPN 210. Of course, there may be a plurality of similarly-equipped issuer, and other, facilities.

Stand-in processing can be provided via an authorization subsystem located at a central location 216. Such subsystem can interface with the VPN 210 and can respond to provide authorization service on behalf of issuer 214 when, e.g., the issuer is a member or other customer or entity not connected via the VPN, is unavailable, cannot be reached, or responds late (for example, outside the time limits specified by the network). It is currently envisioned that most or all members and/or customers will be electronically connected to the payment processing network operator via the VPN, as issuer 214 is in FIG. 2.

Figure 3:
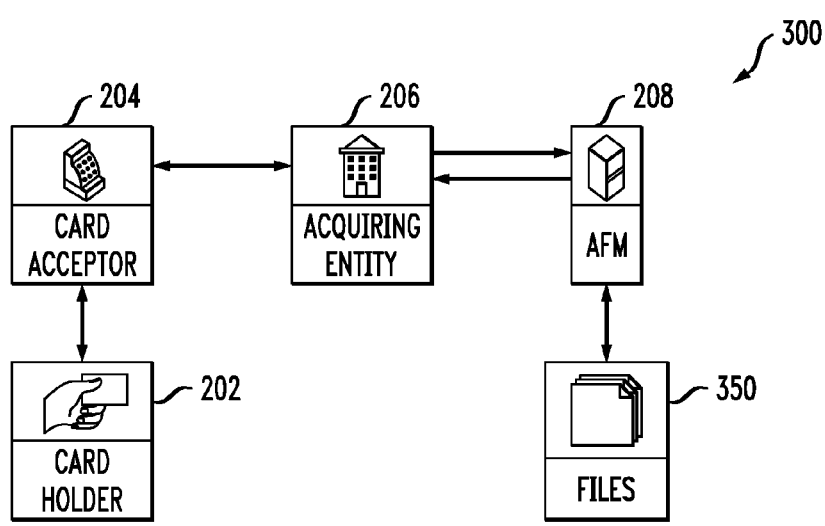
FIG. 3 shows file processing flow according to an exemplary embodiment of the present invention.

FIG. 3 shows a block diagram 300 of certain optional features of system 200, which can be configured to implement a file processing flow according to an exemplary embodiment of the present invention. Items similar to those in FIG. 2 have received the same reference character and will not be described again. The arrows are for convenience in depicting the file processing flow. In block diagram 300, active file manager 208 is provided with an appropriate file structure 350 to be discussed further below (as discussed below, in some instances, structure 350 may be a list or "constructed file"). In one or more embodiments, the AFM (Active File Manager) has an AFL (Active File List) that is a constructed file of both positive and negative accounts. That is, it is a list of all accounts active in the transit (or other) system, as well as the lists from MasterCard, Visa, and the like.

To accelerate terminal decisioning in high volume environments such as the transit market (where transactions may often be for a relatively small monetary amount), according to an aspect of the present invention, the offering of an authorization message from the merchant to the issuer can be facilitated (in one or more embodiments, the message can be a "standard" message in the sense described above). The first time a cardholder account number is utilized at the merchant location (in such a case, the account number will typically not be on file yet), the transaction can be (optionally) automatically approved (in one or more embodiments, by an intermediary such as an active file manager to be described herein). Following the issuance of the approval response to the terminal, a payment processing network operator (including, by way of example and not limitation, an entity colloquially known as a "credit card company") can facilitate an authorization message all the way to the issuer for that cardholder account number. Again, as noted above, such message can be a "standard" message, not in the sense of being taught or suggested by prior techniques, but in the sense that the flow of messages (as opposed to inventive usage and contents) is commonly recognized, or commonly accepted. The dollar (or other currency) amount reflected in the authorization request can be based on desired spending limit parameters established by an entity such as the merchant and/or the issuer. If the issuer declines the authorization, the spending limit will (in some instances) be set to zero for that cardholder account number, for example, by making an appropriate entry in a file designated as the active file, to be discussed further below. In addition to, or in lieu of, setting a spending limit to zero, one could instead set a flag to indicate that the issuer declined the authorization. If the transaction is approved, a spending limit equal to the activity limit amount for a certain time period (e.g. the pre-authorization amount for a day), preferably (but optionally) less the value of the first transaction, can be established, again, e.g., via an appropriate entry in the active file.

Each subsequent transaction can be verified, for example, against the active file, to determine if the account has a "pre-approved spending limit." As additional transactions decrement against the spending limit, authorization requests can be initiated to the issuer to replenish the spending limit. Note that the merchant could elect to perform an authorization for the first transaction before sending a response to the terminal. The merchant may wish to weigh the response time against the financial risk of the transaction.

By way of summary and presentation of further detail, in some instances, the first time a card is presented (that is, a card not previously used in the system), access to a controlled area, such as a transit system, may be allowed by default, since there would typically not be time to perform a full, traditional credit card authorization. Subsequently to allowing access, however, one could perform an authorization request and set a flag indicating the status (for example, that the account number was not yet on file). In some instances (for example, post funding), the authorization might be for only a nominal sum, such as one dollar or the like, merely to determine that an account is in good standing. The distinction between pre-fund and post-paid approaches should be set forth at this point. In a pre-funded transaction, we perform the authorization, allow the rides to be taken, and then clear and settle. In a post-paid transaction, the complete financial transaction (authorization, clearing and settlement) occurs prior to the cardholder taking the rides. It should also be noted that in one or more embodiments, with the first tap (presentation of the card), the decision to allow the cardholder to either ride or to wait for the issuer authorization response is based on a system parameter set by the merchant (for example, the transit agency).

The exemplary solution just discussed may afford one or more advantages. For example, it can provide the merchant and the acquirer control over authorization decisioning, leveraging the authorization processes (which can, as noted, employ a "standard" flow). The on-line authorization aspect of this solution can limit merchant liability for the transactions, which results in a more attractive solution to merchants and acquirers. This solution also provides the issuer with additional risk management in high traffic and/or quick response environments, as the issuer is making the authorization decision. The issuer can leverage their existing fraud scoring functionality to quickly identify and act on fraudulent activity within these environments.

The on-line authorization feature also means that these transactions can be sent to a location such as 216 for stand-in processing, on behalf of the issuer, should the network experience communication problems. As with any stand-in processing, the transactions can be stored and forwarded to the issuer once the issuer is able to receive messages again; either as individual messages or in a batched format.

By leveraging existing infrastructure, these transactions can be included in a data warehouse such as 154, and subsequently can be used by a party such as, for example, the issuer, a merchant, and/or a merchant acquirer or merchant payment service provider in a variety of ways, including participation in a rewards program which would be of benefit to their cardholders and/or customers.

Note that the above-described flow is typical of the authorization that can be sent all the way to the issuer or stand-in processing facility, on behalf of the issuer (again, optionally but preferably employing "standard" message flow). It can be performed for the first transaction that is seen for a particular account number and then periodically after that first transaction. The authorization is sent, e.g., after an active file response is provided to the merchant, based on the active file process flow described below. Once the account number is known in the system (after its first use), subsequent authorizations can be performed prior to the available balance reaching a predetermined value, such as zero. Once the value is depleted, the account balance can be reset by conducting another authorization.

Front end processors, such as processor 212, and VPNs, such as VPN 210, are well-known to skilled artisans. In one specific example, the processor 212 is a MIP™ processor, and the VPN 210 is a telecommunications network providing MASTERCARD BANKNET® telecommunications network services (registered trademark of MasterCard International, Inc. of Purchase, N.Y.).

Figure 4:
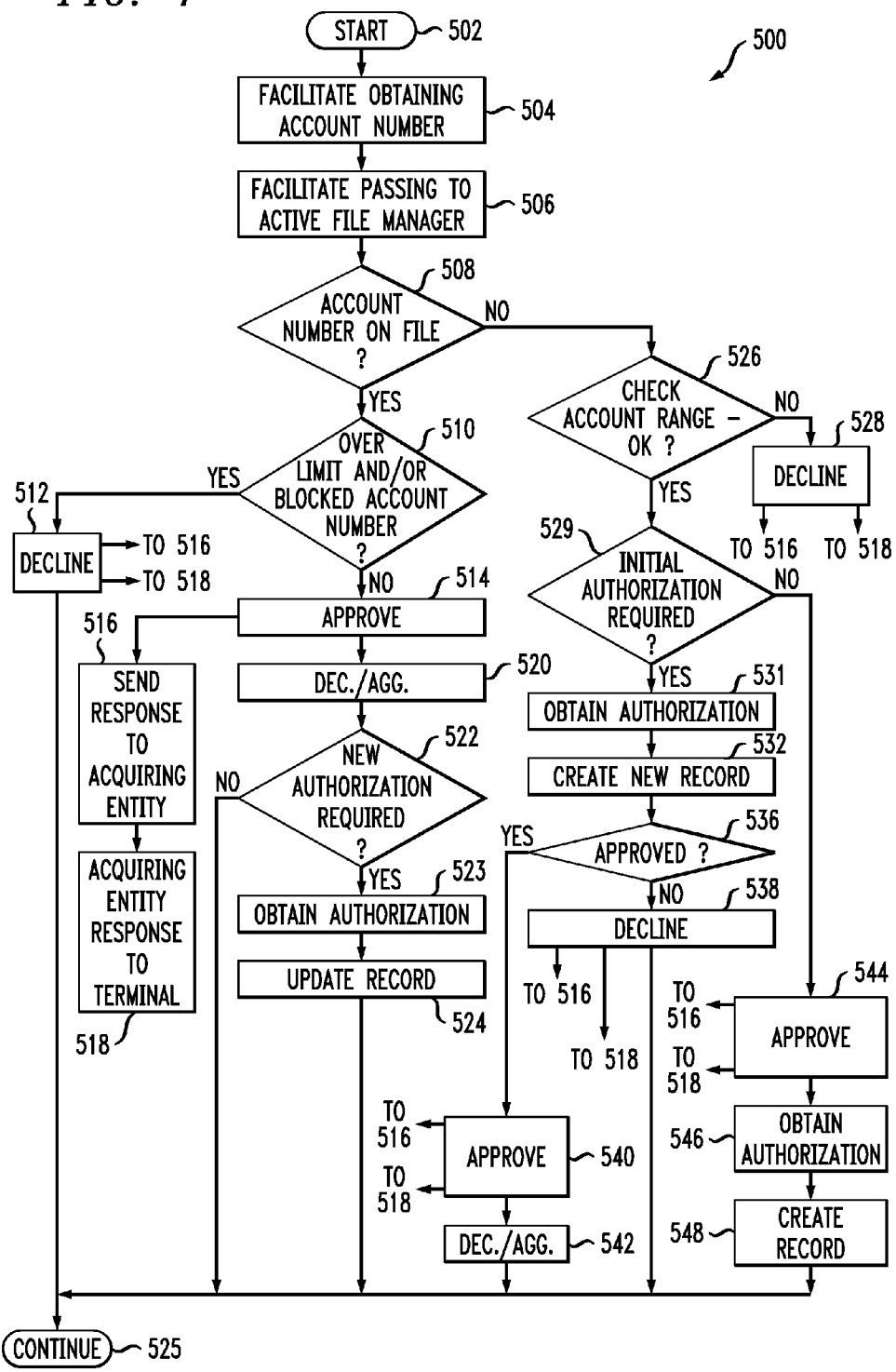
FIG. 4 is a flow chart of an exemplary method according to an aspect of the present invention.

Referring to FIG. 4, and also back to FIG. 3, active file processing flow according to one exemplary embodiment of the present invention will now be considered. FIG. 4 presents a flow chart 500 of exemplary method steps for such processing, indicative of a method of authorization of usage of a payment device (having an associated account number) at a merchant. After beginning at block 502, at step 504, a step of facilitating obtaining an account number can be conducted; for example, the cardholder can tap his or her card or other payment device at the merchant's terminal. As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. At block 506, a step of facilitating passing of the account number to the active file manager 208 is conducted. For example, the account number can be passed through the acquiring entity to manager 208.

Processing by a payment processing network operator can proceed, for example, as follows. The active file manager can process the transaction against the active file. At decision block 508, a determination can be made whether the account number is on file. If such is the case, as indicated by the "YES" branch of block 508, a determination is made at block 510 whether the spending limit has been reached, or the account number is blocked, or some other predetermined limiting condition is exhibited by the account, such that the transaction should be declined. As indicated at the "NO" branch of block 510, if the spend limit has not been reached, approval of the transaction, sending a response to the acquiring entity, and having the acquiring entity respond to the terminal can be carried out as at blocks 514, 516, and 518, respectively. In parallel, decrementing ("DEC.") of the spend limit (for example, by updating the file) can be carried out as at block 520 (in other instances, wherein a post-funded approach is employed, aggregation ("AGG.") rather than decrementing may be carried out). As noted, as used herein, "facilitating" an action includes performing the action, making the action easier, helping to carry the action out, or causing the action to be performed. For purposes of illustrative convenience, not every block in FIG. 4 includes the word "facilitate," but it will be understood that the method depicted broadly includes facilitation of the indicated actions as well as their actual performance. If the case of the "YES" branch of block 510, the transaction is declined at block 512, and processing continues at block 525. Also, a parallel flow to steps 516 and 518 can take place from block 512.

At block 522, a determination can be made whether a new authorization is required. Such could be the case when certain predetermined criteria occur, for example, when a certain number of transactions since the last authorization have occurred or when a certain balance is reached, or in general, when a parameter associated with the account number is reaching a predetermined relationship with the spending limit (say, available balance getting too low or amount spent without a new authorization getting too high). When the counter, balance, or other indication has been reached so as to indicate a new authorization is required, as shown at block 523, authorization can be obtained and then the appropriate record can be updated as at block 524. Processing continues at block 525. It should be noted that the steps depicted in the flow charts herein are exemplary in nature, and not all need be performed in any particular embodiment of the invention; furthermore, the order of the steps may be changed as desired. However, it is presently believed preferable that step 523 be performed after the response is sent to the acquiring entity in block 516, so as to improve response time. When a new authorization is not required in block 522 ("NO" branch), processing can proceed directly to block 525. In general, it may be desirable to approve an individual transaction before seeking a new authorization from the issuer (setting or resetting spending limit), to keep transaction times low.

If the account number is not on file, i.e., "NO" branch of block 508, as shown at decision block 526, a check can be made of the account range to determine if transactions are allowed for the particular merchant type. If the transactions are allowed, as at the "YES" branch of block 526, a decision can be made at block 529 whether initial authorization is required; if such is the case, authorization can be obtained at block 531. A new record in the active file can be created at block 532. An approval decision can be made at block 536, and responsive to a "YES," (i) approval and (ii) decrementing or aggregation steps analogous to steps 514 and 520 can be carried out at steps 540 and 542. In one or more embodiments, where an account number is not on file, as per the "NO" branch of block 508, the account is post-funded by default and step 542 is an aggregation step. Processing continues at block 525. If a "NO" decision is reached, the decline occurs at block 538. Also, a parallel flow to steps 516 and 518 can take place from both blocks 538 and 540.

If the transaction(s) are not allowed (e.g., based on a zero amount spend limit) ("NO" branch of block 526), the transaction is declined at block 528, and (parallel) flow proceeds with steps 516 and 518. Also, if decision block 529 yields a "NO," approval can take place as at block 544, and steps 546 and 548 can be performed, analogous to steps 531 and 532 respectively, except that record creation in block 548 is not for a new record as in block 532. Also, a parallel flow to steps 516 and 518 can take place from block 544. Following block 548, processing can continue at block 525.

In view of the foregoing discussion, it will be appreciated that in one aspect, following the issuance of the approval response to the terminal, the payment processing network operator can facilitate the issuer obtaining an authorization message for that cardholder account number (as noted, in one or more embodiments, a "standard" message flow can be employed). The dollar amount reflected in the authorization request can, as noted, be based on desired spending limit parameters established by an appropriate entity such as, e.g., the merchant and/or issuer. This functionality can be carried out, e.g., via the active file manager. It will be appreciated that as contemplated herein, including the claims, facilitation of the issuer obtaining the authorization message is inclusive of the possibility of the aforementioned stand-in processing, which provides a response on behalf of the issuer based on issuer-provided parameters, and can also employ a ("standard") authorization message as described herein. If the issuer authorizes the transaction, setting a spending limit equal to the daily (or other) activity limit (e.g. the pre-authorization amount for the day) amount, can be facilitated, again, e.g., via an appropriate entry in the active file. In one or more embodiments, the spending limit is set equal to the daily (or other) activity limit (e.g. the pre-authorization amount for the day) amount, less the value of the first transaction. However, in some cases, for example, when transactions are to be of a relatively small and/or fixed amount, the value of the first transaction might not need to be subtracted or might be built in to the activity limit.

In some instances, the spending limit parameters may include an aggregation limit for a post-funded payment device. That is, transactions, such as subway rides, are allowed with an authorization from the issuer until they add up to a certain amount, at which point a clearing transaction will be submitted to the issuer. In other instances, the spending limit parameters may include a decrementing limit for a pre-funded payment device; that is, transactions, such as subway rides, are allowed without an authorization from the issuer until they have decremented a pre-paid balance down to a certain amount, at which point an authorization from the issuer is required.

Examples will now be given of content of exemplary files in file structure 350, which may be maintained on processor 208 by a payment processing network operator; it is to be appreciated that these are exemplary in nature, and various implementations may include less than all the indicated parameters, and/or may include additional parameters not discussed here. Further, files may be combined or additional files may be employed as desired. Contents of an account range file, which may be consulted, for example, in connection with block 526, may include, but are not limited to, one or more of a low range, a high range, a transaction-allowability indicating parameter indicating whether certain (e.g., transit system such as bus, subway, metro, underground) transactions are allowed, an authorization frequency in time units such as days, an authorization frequency in terms of number of transactions, and the like. The low range and high range might specify a range of account numbers eligible for a certain kind of transaction. For example, for sixteen digit account numbers, the eleven most significant digits of a lower limit on eligible account numbers and the eleven most significant digits of an upper range of eligible account numbers might be specified. The parameter indicating whether certain transactions were allowed could have, e.g., a simple yes or no value.

Contents of the aforementioned active file may include, but are not limited to, one or more of an account number, a limit parameter (such as maximum dollar amount per transaction), a last authorization date, a number of transactions since authorization, an authorization frequency in days (how much time, e.g., how many days, between authorizations) and an authorization frequency specified in transaction terms (e.g., how many transactions between authorizations).

Still with regard to element 350, in some instances, the AFM 208 will "look" at a constructed file system (referred to as the "active file list" or "AFL") or a file that points to other files; that is, element 350 could be such a constructed file system or file that points to other files. In this case, the other files could include a restricted card list (also known as "restricted control list" or "RCL") from a first payment association, such as MasterCard International Incorporated, of Purchase, N.Y., a "hot" card list (from, for example, a transit authority operating a transit system using one or more embodiments of the invention), a list of substantially all recent activity, the restricted card lists from other payment associations (for example, Visa International Service Association of San Francisco, Calif.), and the like. The so-called RCL of "hot" card lists may include, for example, cards believed to be lost, stolen, fraudulently used, and so on. By way of summary, in some instances, we may combine all the RCL lists (for example, MasterCard, Visa, transit authority) plus the list of active accounts together in one list so the AFM can perform a review—basically, the AFM decides if it has seen the account before, and if so, does it have a positive or negative status; if it has not been seen before, a determination may be made regarding what the appropriate business rule is to generate a response. In conclusion, we may pull substantially all pertinent data regarding account status together to make operation easier faster and less expensive.

In general terms, a single file or a constructed file or list available to the AFM may contain at least negative account status information for a number of accounts (the different RCLs, for example), and automatic approval may proceed only if an account number is not found on one of the RCLs. Appropriate file(s) or list(s) may, in some instances, be maintained in random access memory (RAM) for quick access.

An exemplary periodic (for example, nightly) batch file maintenance process will now be described. In terms of the account range file, the dedicated processor, such as 208, can receive a periodic update file, such as a nightly refresh file, from the payment processing network operator based on information from the issuer, and a full file replace (or alternatively application of the appropriate additions and/or deletes to the current file) can be performed on the dedicated processor. That is, a periodic update file may include a complete refresh, or directions to add and/or delete certain records in the file. In terms of the active file, all account numbers that have not been used within X days can be deleted (X is a parameter that can be specified by the merchant, acquirer or other acquiring entity and/or processor) based on the last authorization date. The skilled artisan will of course appreciate that in this context, "processor" means an entity such as the acquirer or other acquiring entity, payment processing network operator, bank, large merchant, and the like, not a piece of hardware. Further, an authorization can be periodically requested for those account numbers previously found on the payment processing network operator's "stop list" to determine whether the account number has been unblocked by the issuer.

It will be appreciated that one or more exemplary embodiments of the present invention can provide one or more advantages. For example, improved merchant and acquirer control over authorization decisioning can be provided, leveraging "standard" authorization processes. On-line authorization aspects of one or more embodiments of the present invention can serve to limit merchant liability for transactions, which results in a more attractive solution for merchants and acquirers. Furthermore, the issuer can be provided with additional risk management in high traffic, quick response environments, as the issuer is making the authorization decision. The issuer can leverage their existing fraud scoring functionality to quickly identify and act on fraudulent activity within these environments. Techniques of one or more embodiments of the present invention can allow verifying that the card is able to be used for a given purchase at a given time, including steps such as determining if the card is valid, requesting a "load" of funds to be used for current purchases, decrementing the funds with each use, periodically reloading the funds and checking status of the card (via the inventive active file manager, outside of decisioning, such as terminal or authorization decisioning).

In certain environments, such as automated fare collection (AFC) in a transit system, transaction timing is quite significant. In many ordinary applications, timing is just an engineering or system requirement. However, transit applications, such as subway turnstile access, may have timing requirements on the order of, say, 300 ms. Typical credit card authorization times may run, for example, from 1000 ms up to 18 seconds. This is simply not acceptable, in order to get passengers rapidly through a turnstile or similar fare gate. Subway turnstiles are but one example of many transit applications, such as bus, subway, light and/or heavy rail, ferries, parking, and the like. It is currently believed that subway applications may have the most severe timing requirements.

One or more inventive embodiments may address the aforementioned issues by making a fast decision, using the same criteria as in normal credit card authorization, but on a high-speed, transit-specific platform (or platform specific to other applications with fast transaction time requirements). The aforementioned AFM may function as a gateway to a payment processing network, such as the MasterCard Banknet® communications network, and may typically be resident on a merchant's or acquirer's premises—in one or more instances, the AFM may be a server that the operator of a payment network places on the merchant's or acquirer's premises to help facilitate such parties performing authorizations. As noted elsewhere herein, the AFM may have access to files or lists such as Restricted Card Lists (RCLs), a restricted list from a transit authority, and so on—such lists may include, for example, account numbers associated with fraudulently used, stolen, and/or lost cards, and the like. Advantageously, in one or more preferred inventive embodiments, the RCL and the like reside on the AFM and not in a terminal such as a turnstile.

Since, due at least in part to the large number of entries in typical RCLs (for example, about 800,000 to 1,500,000), requests for authorization may not be processed sufficiently quickly at the local terminal level, one or more inventive embodiments enable such authorization to be performed at a server (high-speed computer) level. In the exemplary context of access to a transit system, one can think of two separate aspects: (1) request for entry into the transit system (in some instances, as will be discussed further below, a request can proceed from the fare gate, routed through an inventive payment platform, to an AFM for quick decision making), and at a later time (2) payment approval and settlement mechanics will be performed. Where an existing card is presented (that is, its record is present in the inventive system as it has been previously presented to the system), a check can be made regarding whether the card has a positive or negative status. If the card does not yet "exist" (that is, its record is not yet present in the inventive system since it has not yet been presented to the system), the various restricted lists (from payment system operators, the transit authority, and the like) can be checked so as to perform a reasonable due diligence that the card is valid. In some instances, one can also perform standard checks, such as checking the bank identification number (BIN) range for the issuer, performing the Luhn algorithm or Luhn formula, also known as the "modulus 10" or "mod 10" algorithm, which is a simple checksum formula used to validate a variety of identification numbers, such as credit card numbers and the like. It is known to the skilled artisan and is described, for example, in U.S. Pat. No. 2,950, 048, the complete disclosure of which is expressly incorporated herein by reference for all purposes. Other standard tests that can be performed include expiry date and a velocity check parameter. The latter may be a dynamic parameter set by a merchant, such as a transit system operator. For example, there may be a limit of X number of appearances of a particular PAN in the system, for example, 5 or 10 in one day. Such an approach limits the number of times that one can use that particular device in the system over a period of time.

In one or more embodiments, a high-speed telecommunications network, with a minimum speed of 768 kbps, can be employed, for example, from the turnstile (fare gate) to the server. The server may be resident, for example, on merchant (transit authority) premises, on an acquirer's premises, or housed in a facility of an operator of a payment card network (such as MasterCard International Incorporated) or a facility of a third party processor, and the server may be operated, for example, by the aforementioned operator of a payment card network, or by a third party vendor. In one or more embodiments, the aforementioned server functionality may be embodied, for example, in the payment platform 704. In general terms, the platform and AFM can physically reside anywhere; for example, the Transit Agency premises, premises of a Third Party Processor/AFM Integrator, or even on the Premises of the operator of a payment card network, such as MasterCard International Incorporated. It is, however, desirable that there are high speed connections between the Terminal estate, the platform, the AFM, and payment processing system (such as MasterCard's BankNet® network or the like).

In one or more embodiments, a registration process may be conducted; thus, one or more embodiments of inventive methods may include a step of facilitating registration (for example, to select pre- or post-funded functionality). Someone who has never used the facility, such as the transit authority, before may be provided with, for example, two ways to register: (1) access a registration web site or (2) a call center, and authorization is performed as a result of the registration. Several types of payment options may also be provided, for example: (i) pre-funded and (ii) post-funded. If one selects a pre-funded approach, authorization, clearing and settlement will be conducted for a full amount, say $20, as described herein with respect to, for example, blocks 531 and 546. Subsequent "taps" will decrement such full amount, for example, as per blocks 520 and 542. "Taps" refer generally to presentation of a payment device; in some embodiments, such devices can be MASTERCARD PAYPASS® smart cards or similar device (registered mark of MasterCard International Incorporated, Purchase, N.Y., USA). When a certain threshold, say $10, is reached, the system performs another "auto-load" or "top-up," for, say, $20, as at block 523. So, in this example, the system loads initially $20, decrement to $10, and an auto-load of $20 brings the account balance up to $30. It should be noted at this juncture that in one or more embodiments, the payment card or other payment device that a person uses to access a system, such as a transit system, can be similar to device 112 as shown in FIG. 1, and, in one or more embodiments, may be the aforementioned MASTER-CARD PAYPASS® smart card.

In some instances, in addition to or in lieu of the pre-funded option, a post-funded, post-paid, or aggregate approach can be offered. This could also involve several options, for example, one could access a website or a call center and pre-register, and a pre-authorization could be conducted. This pre-authorization might be, for example, just a nominal amount such as one dollar, inasmuch as on debit accounts, some people manage their accounts so closely that even a twenty or thirty dollar charge is material, so that in some instances, the initial authorization amount may be advantageously reduced to a nominal amount such as one dollar. Stated differently, the system does not perform an authorization for the full value of what the transaction will be; rather it just validates that the account is a good one, and have the issuer acknowledge that. In another option, the user can simply step up to the turnstile and tap his or her card for the first time. An authorization request is then routed to the AFM, and based on the information that the AFM has at that time, the system makes a decision and provides an approve/decline response to the request for entry into the system. For example, if the account number is not on file (first tap), the system could do a quick check of the account range, as at block 526; if that raises a flag, then decline (block 528) the request; if no flag is raised, the system could perform a more detailed, Payment processing network, Issuer approved, authorization (block 531) or just approve (block 544) the request.

The transit authority may have the option to automatically approve the first appearance of the device. In this case, as part of processing flows by the AFM, which performs one, some, or all of the above-described checks, such as expiry date, Luhn test, restricted card lists, upon checking the AFL, the AFM will recognize that as this device PAN is not on the AFL, it is being presented for the first time, and will automatically approve it (risk is limited to the value of one subway fare). Another option is a separate authorization terminal or "activation station"; that is, a separate dedicated terminal that is typically located in a facility of the transit authority but is distinct and separate from the fare gates. One could use this option if the transit authority experiences excessive fraud as a result of an auto-approve option. In this approach, post-funded customers register first by stepping up to the separate "activation station" terminal where they must present their card for the system to perform a full authorization (through the AFM, Banknet (payment processing network) all the way to the issuer and back, to ensure that the account is valid). This is a risk-mitigation option. Use of the separate "activation station" terminal for this approach prevents passenger queue delays at turnstiles and the like.

Further exemplary details will now be provided with regard to the post-paid option. Aggregation typically works based on two parameters—X dollars or X taps in Y timeframe; these may be dynamic parameters set by the merchant, such as the transit authority. For example, there may be a threshold limit of 10 taps in 2 weeks. One might allow, say up to 10 taps, or elapsed time of up to 2 weeks, whichever comes first—in essence, the reverse of the pre-funded approach—instead of decrementing usage activity, the system aggregates it, and once a threshold is reached, the system initiates a financial authorization for the value of the balance of the account. So, in this example, when the system receives notice of the tenth ride (tap) which equates to a balance of say $20 dollars, the system will automatically go out for an authorization for $20 dollars. This is cleared and settled offline, and the account is then reset and listed in good status. In this way, the system will have a record that the account is in good standing when the rider shows up to enter the transit system again. Thus, in general terms, limiting conditions as discussed elsewhere herein can, in some instances, include the condition that a predetermined number of presentations (taps) have taken place at the transit authority or other merchant, or that a predetermined amount of time has passed since the last authorization from the issuer. Further, as discussed below, parameters such as limiting conditions may vary based upon a brand of payment device or among different types of products within a brand.

It should be mentioned that throughout this application, words such as "one" and "we" are not necessarily intended to imply human agency, but may refer also to steps done partially or entirely by computers or other automated techniques.

As noted above, in some approaches, when an account has a bad (negative) status (the issuer's authorization decision may be to decline the transaction), the system sets the account limit to zero or even a negative value. However, as also noted, alternatively or in addition to so doing, the system might flag the bad (negative) status and keep a positive balance limit (perhaps reflecting a remaining pre-paid amount). For example, in the instance of a pre-paid customer; he or she may have an initial 20 dollar balance that, through his or her usage, is decremented down to 10 dollars. Where 10 dollars is a pre-established threshold, the system initiates a "top up" or autoload authorization that could be declined by the issuer, i.e., authorization is declined. The system will record the decline result of the authorization request, but continue to permit the person to decrement the residual balance through ridership, and when the account balances reaches zero, the system can then set the account to a negative value for status purposes. Another reason why the system may simply flag a negative status is as follows: as defined in ISO8583 (which is expressly incorporated herein by reference for all purposes in its entirety), there are a large list of response codes which can be used to convey various information, and the merchant, such as a transit agency, may choose to do a "soft" versus a "hard" decline on the person's account. A "soft" decline may be appropriate where the expiry date is past or the account owner is over his or her credit limit. A "hard" decline could be appropriate where the response codes indicate an account with lost and/or stolen cards. One may also want to establish a parameter based period of time that effectively allows the issuer to remedy the problem with the end user. These are some exemplary reasons to separate the account status from the balance.

Figure 5:
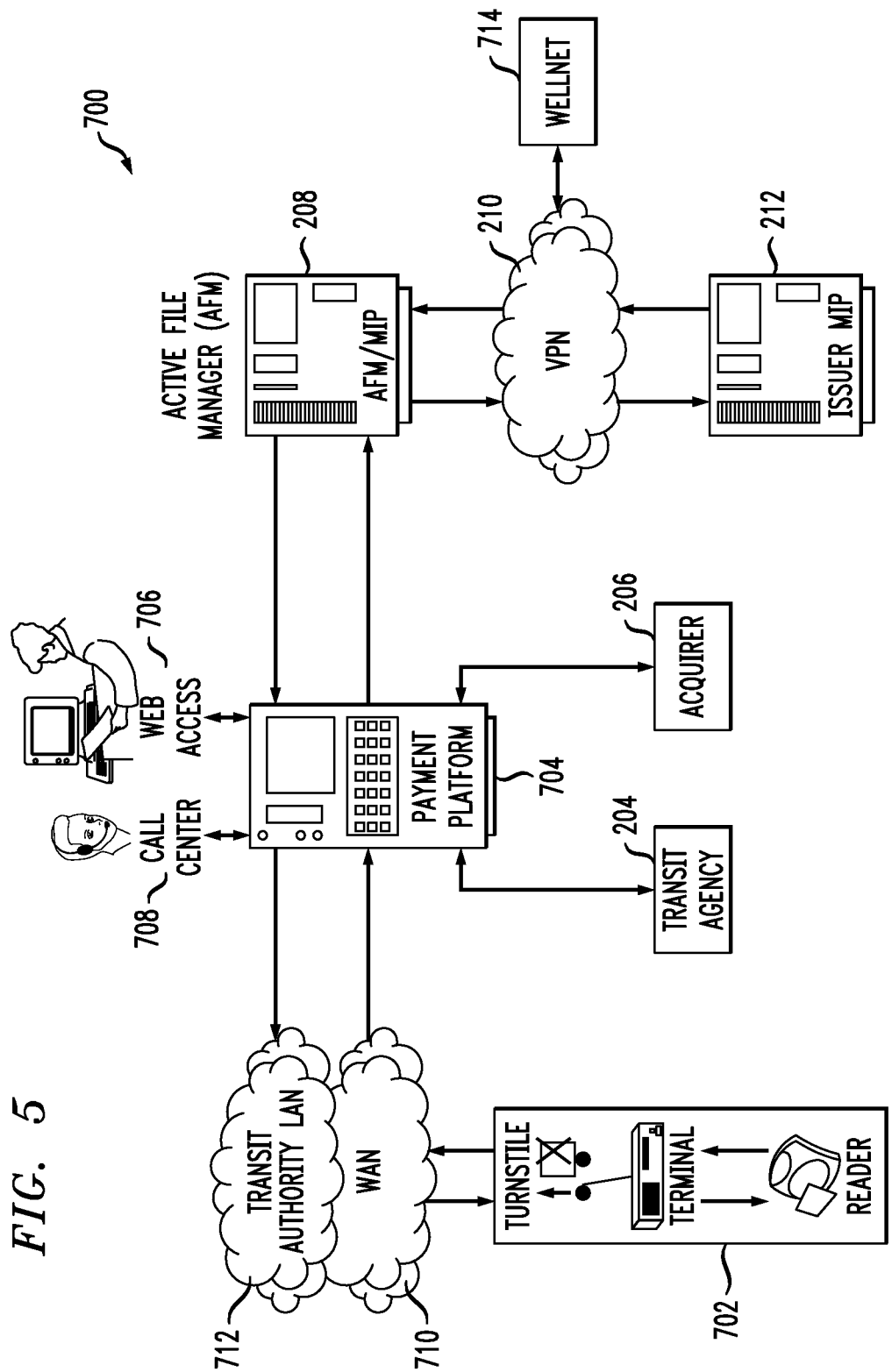
FIG. 5 is a system diagram of an exemplary transit solution, according to another aspect of the invention.

Attention should now be given to FIG. 5, which depicts an exemplary detailed architecture for an exemplary AFC solution 700. The architecture is similar to that of FIGS. 2 and 3, but more detailed, and items similar to those in FIGS. 2 and 3 have received the same reference character. In general terms, three significant components of the system are the fare gate assembly (turnstile, reader and terminal) 702, payment platform 704, and AFM 208. Platform 704 may be in communication with assembly 702, for example, via WAN 710 and/or LAN 712. AFM 208 may also be in communication with platform 704, over a high speed communications network, and the components may be cooperatively configured to carry out one or more method steps disclosed herein. In one or more embodiments, the connection between AFM 208 and platform 704 can be accomplished via a gigabit LAN connection.

AFM 208 functions as a decision maker, going through appropriate criteria and performing a check for people attempting to access the transit system. Platform 704 functions as a record keeper, gathering records of requests, responses, and subsequent authorizations; keeping records of accounts; performing reconciliations and other accounting functions; updating account balances based on activity (for example, decrementing/aggregating and generally tracking transit system rider usage and transaction activity); facilitating pre-registration; and so on. Platform 704 may also handle web access 706 and assist customer representatives in call center 708.

In one or more embodiments, with the first tap, the decision to allow the cardholder to either ride or to wait for the issuer authorization response is based on a system parameter set by the merchant (transit agency, for example). Entry decisioning advantageously takes place between fare gate 702 and AFM 208; with platform 704 acting as a router. Financial authorization could be prompted by AFM 208 or platform 704. If by the AFM 208, upon the first time tap (based on a parameter set by the transit agency that made a business decision to assume the risk), the system could just allow access or (if the transit agency decides otherwise for risk aversion or other reasons) could force the rider to wait for the issuer authorization to be completed. The AFM "sees" it is a first time tap, automatically approves, and sends an authorization that goes through a VPN such as the BankNet® network 210. Another case when an authorization might be prompted is as follows: a user calls in to call center 708 or goes to a web site 706 to set up an account. A customer services representative at 708 interfaces with platform 704, and if it is the first time it has seen that the system has seen this particular account, it will initiate an authorization. Yet another case when an authorization might be performed is as follows: where the transit user's activity caused the balance to near a pre-established threshold, from decrementing or aggregating, and the system then initiates another automatic transaction for the appropriate value.

For example, a user may opt to pre-fund his or her account balance for 20 dollars, and his or her subsequent usage may cause the system to then decrement his or her balance down to 10 dollars, at which time the system may initiate an automatic prompt for a new authorization through the AFM 208 to VPN 210. In the aggregate approach, a rider might tap 10 times, reach his or her account threshold, and then there would be an automatic prompt for a new authorization. When an authorization to the issuer is desirable but time is critical, such as in the instance of first time access, or when the decrementing/aggregating approaches a predetermined limit, such as 10 taps, the system may (based on a transit agency business decision and set parameters) to simply allow access to the system without a detailed check, and then in near real time perform an authorization to the issuer.

In the classic merchant card processing scenario, the merchant's (transit agency in this example) acquirer processes all of the card transactions for the merchant. There are three steps to handling a card transaction: authorization, clearing and settlement. The acquirer typically routes each of these transactions to the respective card association, that is, Visa, American Express, MasterCard, Discover and so on. In one or more exemplary inventive embodiments, such as a transit platform solution, it is a card association (operator of a payment card network), such as MasterCard International Incorporated, and not the acquirer, that is performing the authorization for the merchant and then later passing a record of the result of the authorization, along with the clearing and settlement records, to the merchant's acquirer for processing. Inasmuch as such card association (for example, MasterCard) is conducting the actual authorization over its own proprietary VPN system, instead of routing the third party card (for example, non-MasterCard) authorization requests outside the system, in one or more embodiments, there may be unique parameters established to treat each brand or product separately. By way of example, if the operator were MasterCard, and Visa or American Express, or even another MasterCard product, such as the Maestro™ product (European debit product) follow a different set of rules for authorization, clearing and settlement, the inventive platform 704 can be designed to handle them accordingly.

One possible example of applying different rules based on brand is as follows: suppose a card is presented for which RCLs are not present in the AFM. For example, suppose the AFM can access a constructed file for MasterCard, Visa, and a transit authority list of troublesome accounts, but the constructed file does not include American Express or Discover products. When such a product is encountered, since no RCL information is available, a full authorization may be forced before the cardholder is given access to the system. This is but one example of applying different rules for different brands of cards or different products within a brand.

Subsequent handling of full value authorizations, settlement and clearing can, in some instances, also be brand-by-brand. Visa or American Express may set their own aggregation rules, different than those of MasterCard. For example, MasterCard may have a limit of 25 dollars or 10 taps and Visa may have a limit of 15 dollars or 5 taps. Merchants might thus be protected up to 25 dollars with MasterCard and up to 15 dollars with Visa. Whether pre-funding or post-funding (aggregation) is employed, in one or more embodiments, authorization, clearing and/or settlement can be parameter-based and vary by brand or products within a brand.

As noted, three significant components of system 700 include the terminal 702, the platform 704 and the AFM 208. Given the size of a transit agency's terminal estate (may vary, for example, from 100-5000), and the correspondingly large number of individual rider transactions, records of this activity are typically communicated from one component to another in regularly scheduled batch transmissions. However, based on the amount of time that passes in between each batch, the information upon which the AFM bases its decision may be delayed, or otherwise stale. Thus, in one or more embodiments, the system 700 is designed to manage the flow of information across an open communication channel so that each component 702, 704, 208 is updated on an as-near real time basis as permissible, given the volume of communications that occur in any given time sequence, based on pre-established QoS (Quality of Service) prioritization. Typically in ordinary credit card processing systems, updates to the RCL are done every 4 hours or so. In AFC systems, updates may typically be done periodically in batch mode. Terminals 702 may communicate to the host server 704 in batch, and the host server may perform authorizations in batch. One or more embodiments of inventive systems work on the real-time exchange of information. As the transactions occur, the systems share that information over open interfaces and update each other real-time per QoS (Quality of Service) prioritization. In one or more embodiments, the AFM 208, platform 704, and terminals 702 all update themselves on a real-time basis. In general terms, data and/or file transfers can occur in batch and in real time based on QoS prioritizations; some transfers may occur as soon as possible, typically within seconds or minutes (this may be thought of, in some embodiments, as "near-real-time" functionality). The skilled artisan is familiar with real time updates employing QoS prioritization and the like, and, given the teachings herein, will be able to implement same in the context of one or more embodiments of the invention.

Still referring to FIG. 5, assembly 702 is preferably connected to platform 704 via a wide area network (WAN) 710 and/or a local area network (LAN) 712, such as that of a transit authority. The platform 704 may support the fare gate (broadly understood to include subway turnstiles, bus fare boxes, and the like) and account transactions by maintaining account statuses and routing requests and responses for authorization. The platform may manage various types of account functioning, such as pre-funded and post-paid. Among the tasks that may be managed by platform 704 are:

- routing fare gate transaction activity between the transit agency reader/terminals and the AFM.
- managing the necessary funding options for contactless device customers and their associated accounts, such pre-fund or Pay-As-You-Go (post-paid) accounts. The Post-paid transactions can be processed via either real-time or as aggregated authorizations.
- hosting a transit agency-defined fare table and transfer rules (the fare rules may be defined by the transit agency, often as part of a public process, and the platform 704 typically does not change these rules; rather its function is to apply these rules to riders' accounts in the AAL) and applying these fare and transfer rules to riders' accounts.
- preparing the information to facilitate clearing messages between transit agencies, their acquirers, and the operator of a payment card network, such as MasterCard.
- receiving and managing the transit agency's Restricted Card List (RCL).
- supporting customer service functionalities such as web site 706 and call center 708 interfaces.

"Well net" 714 is a monitoring and parameter management system for MIPs 208, 212.

In one or more embodiments, the platform 704 is configured to function in a degraded service, or "orphan mode," by performing one or more of the following:

Stand-In—The platform 704 stands-in and provides a response on behalf of another upstream component (for example, AFM 208, issuer processor 212) where the latter does not respond within a requisite standard service interval.

Velocity Checks—The platform 704 may limit the amount of transactions that an account can conduct within established parameters. The platform's constraints may perform at two levels of velocity checks; one at the terminal level and one system wide. These two levels of parameters may be optional and work independently of each other, and can be collectively managed by the platform.

Time-Out Parameters—The platform can have independent, but sequential (to the other components), time out clock capability that will determine first, when to switch from a primary to an available redundant (a.k.a. backup) upstream unit, or second, when to perform a fare gate transaction Stand-In response on behalf of the collectively unresponsive upstream systems. There can be, for example, at least three separate time out parameters (also referred to as criteria). A first parameter or criteria is the amount of time a given component (terminal, platform, or AFM) waits for a response from the next upstream component before making a decision (approve/decline) on its own. This can vary among the different components, or be based on the location of components, such as terminals (for example, in a subway turnstile as opposed to a bus). It will be appreciated that the AFM has the best information, the platform has less current information than the AFM, but still better than the terminal, and that the terminal has the least appropriate information on which to render a decision (for example, Luhn algorithm, expiry date, whether valid card number). A second parameter or criteria is how many times an upstream failure to respond occurs before the unit in question invokes "orphan mode" or "standalone"—for example, after 3-5 times (3-5 consecutive passengers present their cards and the upstream communication fails), the component may no longer try to "get" upstream any more. One may look, for example, for a certain number of consecutive communication failures, or a certain number of failures in a given number of tries (for example, failure for five out of 10 passengers). In one or more embodiments, in the case of an intermittent communication failure, we would not enter orphan or standalone mode, while in the case of a "cut cable," we would enter such mode. A third parameter or criteria is that brands of cards with an RCL may be afforded a tighter time-out parameter, since the RCL provides a fairly good basis for local decisioning, while brands without an RCL may be afforded a more relaxed time-out since local decisioning might likely be less accurate.

Health Monitoring—The platform 704 may have time-based health monitoring capability for itself and for (preferably all) upstream, and (preferably at least some) downstream, system interfaces.

Heartbeat/Ping Test—The platform 704 may have the capability to monitor the health of its various interfaces, as well as to periodically (that is, at configurable intervals) attempt to reconnect previously failed interfaces.

First-in-List Sequencing—The platform 704 may have the capability to, based on the communications status, direct connectivity, on a configurable basis, to the first upstream system available in any given instant.

Alarm—The platform 704 may be configured to initiate a maintenance and/or service interruption "red flag" message for service dispatch by the service desk at the call center 708.

Batch File Updates—The platform 704 may be configured to have batch file update capabilities, subject to quality of service (QoS) prioritization (a.k.a. drip feed and/or throttling), to update respective backup and upstream components with orphan mode transaction history upon service restoration.

"Warm" Spare—The primary platform 704 may update the secondary platform with recent transaction data, for example, every twenty four hours.

Load Balancing—defined herein as the division of the terminal estate transaction traffic across multiple platforms 704 (or a minimum primary and secondary) that are diversely configured, to provide real time redundancy, to manage the entire estate in the event of a single link communications failure.

In some instances, the active file manager is a primary active file manager and the payment platform is a primary payment platform, and the system can include a secondary active file manager and a secondary payment platform, operatively configured for backing up the primary active file manager and the primary payment platform, respectively. In some cases, there may be two twin, collocated, active file manager units and two twin, collocated payment platforms, which dynamically load balance, route and manage terminal estate communications, authorizations, and file update activity. Further, the active file manager and/or payment platform module can be further configured to rout communications to the collocated components, or the disaster recovery payment platform or active file manager in case of a malfunction of the primary payment platform or active file manager.

It should be noted that system 700 may advantageously employ one or more techniques disclosed in World Intellectual Property Organization International Publication Number WO2006/124808, entitled "Method and System for Using Contactless Payment Cards in a Transit System," the complete disclosure of which is expressly incorporated herein by reference for all purposes. Furthermore, the detailed description of such publication is reproduced hereinbelow.

Figure 6:
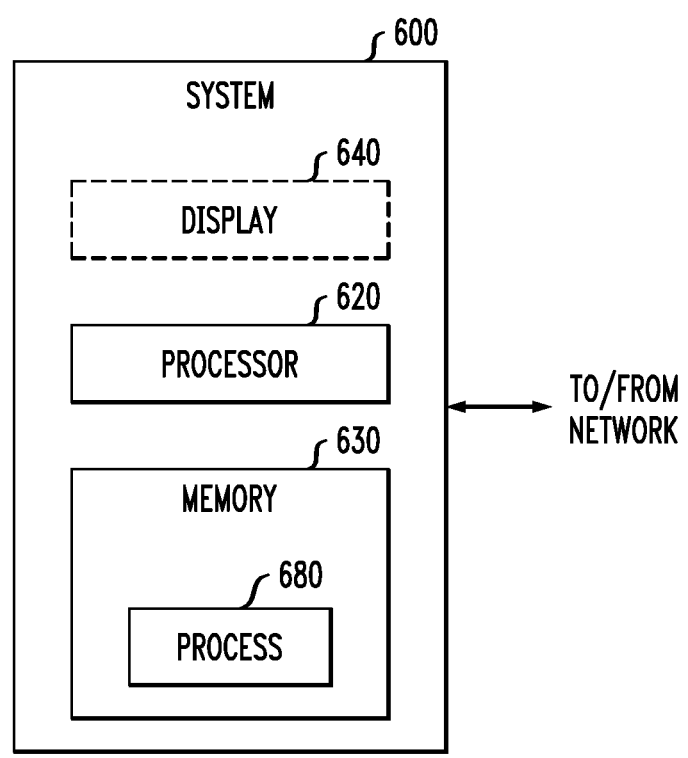
FIG. 6 is a block diagram of an exemplary computer system useful in one or more embodiments of the present invention.

The invention can employ hardware and/or software aspects. Software includes but is not limited to firmware, resident software, microcode, etc. Software might be employed, for example, in connection with one or more of a terminal 122, 124, 125, 126, 702, a front end processor 208, 212, an authorization subsystem located at a central location 216, a processing center 140, 142, 144 (optionally with data warehouse 154) of a merchant, issuer, acquirer, processor, or payment processing network operator, and/or platform 704. Firmware might be employed, for example, in connection with payment devices such as cards 102, 112. FIG. 6 is a block diagram of a system 600 that can implement part or all of one or more aspects or processes of the present invention. As shown in FIG. 6, memory 630 configures the processor 620 (which could correspond, e.g., to processor portions 106, 116, 130, processors of elements 208, 212, 702, 704, processors of authorization subsystems such as that located at a central location 216 or processors of remote hosts in centers 140, 142, 144) to implement one or more aspects of the methods, steps, and functions disclosed herein (collectively, shown as process 680 in FIG. 6). Different method steps can be performed by different processors. The memory 630 could be distributed or local and the processor 620 could be distributed or singular. The memory 630 could be implemented as an electrical, magnetic or optical memory, or any combination of these or other types of storage devices (including memory portions as described above with respect to cards 102, 112). It should be noted that if distributed processors are employed, each distributed processor that makes up processor 620 generally contains its own addressable memory space. It should also be noted that some or all of computer system 600 can be incorporated into an application-specific or general-use integrated circuit. For example, one or more method steps could be implemented in hardware in an ASIC rather than using firmware. Display 640 is representative of a variety of possible input/output devices.

System and Article of Manufacture Details

As is known in the art, part or all of one or more aspects of the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, EEPROMs, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk. The medium can be distributed on multiple physical devices (or over multiple networks). For example, one device could be a physical memory media associated with a terminal and another device could be a physical memory media associated with a processing center.

The computer systems and servers described herein each contain a memory that will configure associated processors to implement the methods, steps, and functions disclosed herein. Such methods, steps, and functions can be carried out, e.g., by processing capability on elements 102, 112, 122, 124, 125, 126, 140, 142, 144, 208, 212, 216, 702, 704, or by any combination of the foregoing. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Thus, elements of one or more embodiments of the present invention, such as, for example, the aforementioned terminals 122, 124, 125, 126, 702, processing centers 140, 142, 144 with data warehouse 154, processors 208, 212, 704, processors of authorization subsystems such as that located at a central location 216, or payment devices such as cards 102, 112 can make use of computer technology with appropriate instructions to implement method steps described herein. By way of further example, a terminal apparatus 122, 124, 125, 126, 702 could include, inter alia, a communications module, an antenna coupled to the communications module, a memory, and at least one processor coupled to the memory and the communications module and operative to interrogate a contactless payment device (in lieu of the antenna and communications module, appropriate contacts and other elements could be provided to interrogate a contact payment device such as a contact card or read a magnetic stripe). By way of yet a further example, an active file manager apparatus for processing an active file in a payment system, could include a memory, and at least one processor coupled to the memory. The processor can be operative to perform one or more method steps described herein, or otherwise facilitate their performance.

Accordingly, it will be appreciated that one or more embodiments of the present invention can include a computer program comprising computer program code means adapted to perform one or all of the steps of any methods or claims set forth herein when such program is run on a computer, and that such program may be embodied on a computer readable medium. Further, one or more embodiments of the present invention can include a computer comprising code adapted to cause the computer to carry out one or more steps of methods or claims set forth herein, together with one or more apparatus elements or features as depicted and described herein.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention. Reproduction of Detailed Description of World Intellectual Property Organization International Publication Number WO2006/124808, entitled "Method and System for Using Contactless Payment Cards in a Transit System"

The present invention provides an automatic fare collection (AFC) solution for transit systems. This AFC solution, which is based on the use of smart cards, allows automatic fare collection systems and procedures to be implemented in a transit system. The automatic fare collection systems and procedures can advantageously reduce operating costs by reducing, for example, currency handling costs, ticket vending machine and turnstile maintenance costs, fare media procurement costs (e.g., plastic/paper fare cards), and the number of staffed ticket booths in operation. The AFC solution is based on smart cards (e.g., MasterCard's PayPass) that conform to a common or open industry standard (e.g., ISO 14443 Standard) for contactless payment devices.

FIG. 7 is a block diagram, which shows the logical and structural components of an exemplary electronic payment solution 1100 for a transit system. Exemplary electronic payment solution 1100 is based on Master Card's PayPass implementations. In solution 1100, a cardholder is issued a PayPass card 1110 by an issuer 1120. The customer can present the PayPass card to pay fares, for example, at a turnstile 1132 (e.g., a subway turnstile or gate), to gain entry to gated pay areas of the transit system. Turnstile 1132 is provided with a RFID-enabled card reader 1130 for electronically reading the PayPass card presented by the customer for automated fare collection (AFC). Card reader 1130 is electronically linked to a transit system's payment host 1140 via an optional terminal controller 1150 and a PayPass Transit Payment Platform 1160. The customer's fare payment may be electronically processed in a manner similar to the present payment-by-card schemes that are used to process PayPass credit or debit card payment transactions, for example, in the retail industry. For this purpose, Transit Agency Payment Host 1170 is linked to card issuer 120 and other entities or organizations via a conventional payment-by-card electronic network 1190. The transaction payment processing steps (e.g., transaction/payment authorization request, approval, and settlement steps) may involve conventional electronic payment infrastructure entities such as an acquirer 1170 and the PayPass card association 1180 (i.e. MasterCard) who are also linked by network 1190.

In an implementation of payment solution 1100, customers may set-up and register pre-funded transit accounts, which are linked to the customers' PayPass cards. In practice, a customer presents or "taps" or his or her PayPass card 1110 at card reader 1130 mounted on transit turnstile 1132 to gain access to the gated pay areas of the transit system. Data encoded in the card is read and transmitted to terminal controller 1150. Terminal controller 1150 responds by either accepting or rejecting the card. The customer is accordingly given or denied access through the turnstile. Terminal controller 1150 software communicates a transaction data record to PayPass Transit Payment Platform 1160. Pay Pass Transit Payment Platform 1160 provides necessary authorizations and batch settlement processing functions for transactions, as well as continued maintenance of the card terminal software.

It will be understood that the selection of the PayPass implementation for purposes of illustration is only exemplary, and that the principles of the present invention can be more generally applied to electronic payment devices and systems that operate under other common industry or proprietary standards. Other electronic payment devices and systems may be based on contactless cards such as American Express ExpressPay and Visa Wave. The PayPass implementations bring open payments to the transit environment and provide new options to transit entities that are planning to deploy, or already deploying, smart card based payment solutions. The PayPass implementations can be advantageously tailored to leverage open payment solutions to benefit both the transit entities and their customers.

Further, the application of the inventive electronic payment solution is described herein with reference to an exemplary subway transit system—NY City Transit ("NY Transit"), which is operated by the Metropolitan Transportation Authority ("MTA") of the State of New York. It will be understood that the choice of MTA/NY Transit is only for purposes of illustration and that the inventive electronic payment solution may be utilized in any other transit systems (e.g., Staten Island Railway, Long Island Rail Road, Long Island Bus, Metro-North Railroad, and Bridges & Tunnels).

Electronic payment solution 100 may be designed for integrated AFC applications across several transit systems (e.g., subways, buses, railroads, etc.) and also may be integrated with other electronic payment solutions such as the E-ZPass solution, which is deployed in the MTA's Bridges and Tunnels operation for AFC.

With renewed reference to FIG. 1, solution 1100 may be operable with any suitable number of different card types and card distribution models. The transit functionality of these different card types is enabled by suitable design of Transit Payment Platform 1140. The suitable number of card types and card distribution models may be selected with a view to extend smart card use to as wide a proportion of the transit system's ridership as makes economic sense. The selected card types may include, for example, cards that support single-ride, time based (unlimited ride) modes of operation, and/or value based cards that that support pay-per-ride modes of operation. Examples of potential card distribution models include:

(1) Bank Issued Cards (e.g., MasterCard PayPass)

Banks may issue PayPass enabled standard credit or debit cards for general use by cardholders at merchants. These PayPass cards may also be used for travel within the MTA system and have the ability to cater to the needs of the regular commuters in addition to the infrequent travelers and visitors to the region. The cards may either be registered with the transit system to set up a pay-per-ride pre-funded transit account, which may be spent solely within the MTA environment (in a similar manner to E-ZPass). Registered PayPass cards can perform the functionality of a regular MetroCard for value based (pay-per-ride), or time based (unlimited ride) products. Unregistered PayPass cards may be used within the MTA to pay at the gate for a small number of rides each month.

(2) MTA/Bank Co-Branded Cards (e.g., MTA/MasterCard PayPass Co-Branded MetroCard)

The co-branded cards may be marketed and issued by banks as 'commuter', 'city' or 'travel' cards. Within the MTA system, the co-branded cards have functionality similar to that of a regular MetroCard ticket, which is based magnetic stripe technology, for value based (pay-per-ride), or time based (unlimited ride) products. The cards will function as normal bank payment cards outside the MTA environment. All cardholders are automatically registered with the transit system for the purpose of travel, either on a value based (pay-per-ride) or time based (unlimited ride) basis according to cardholder selection at the time of enrollment.

(3) MTA Private Label Card Powered by PayPass:

The MTA private label card may target riders who are regular users of the system but who do not wish to combine their travel cards with bank payment cards. The MTA and its agents may distribute these private label cards via an issuing partner. This card product has functionality similar to that that of a regular MetroCard for value based (pay-per-ride), or time based (unlimited ride) products. The MTA private label card is a true prepaid card that may only be used within the MTA environment. The MTA private label card may be appropriate for under banked customers and/or those who prefer a separate payment card for travel. Customers might pay a fee and/or deposit in order to obtain the card. All cardholders may be automatically be registered with the Transit Payment Platform for the purposes of travel, either on a value based (pay-per-ride) or time based (unlimited ride) basis.

In practice, MasterCard and its member banks will be promoting the RFID-enabled PayPass concept for speedy transactions throughout the United States. As deployment occurs in geographies other than New York City, it may be possible to begin linking up the transit capabilities available in one area with those in another. Initially, this may make most sense on a regional basis, but has the potential to be extended nation wide. Therefore, visitors from other parts of the US will be able to gain entry to the MTA systems using their existing PayPass cards. This may reduce costs for the MTA, and also improve the overall utility of the system for riders. MTA's adoption of a PayPass solution would give riders the ability to travel from Albany to NY City using their MasterCard PayPass card.

Exemplary implementations of solution 1100 based on MasterCard's PayPass may be configured to be consistent or compatible with pre-existing the fare structures and card or ticket types that are used by the transit system. Appendix A shows a fare structure for MTA/NY Transit. Further, Appendix B shows in tabular form a comparison of the transit fare structure features supported by each of the three card types discussed above. Solution 1100 may be configured to support any number of AFC architectures or schemes. An exemplary AFC architecture—"Host plus Distributed Negative File," is based on the use of standard PayPass payment cards. In this architecture, there is no need for any special transit application to be loaded onto the payment cards. A customer presents a standard PayPass card 1110 to turnstile 1130/reader 1132 for fare collection. Turnstile 1130 validates the card data (e.g., personal account number, Expiry Date, and card validation code) and checks whether the card is listed in a negative file or hot list. If the card is listed in the negative file, turnstile 1130/terminal 1150 deny the customer access to the gated pay areas of the transit system. Conversely, if the card is not listed in the negative file, turnstile 1130/terminal 1150 activates a gate to allow the customer access to the pay areas of the transit system. Turnstile 1130/terminal 1150 concurrently or later forwards a raw transaction data record associated with the card use to the transit payment platform 1160, which may be configured to process single-ride, pay-per-ride and unlimited ride transactions. Transit payment platform 1160 receives raw transactions from transit system (e.g., MTA) and processes them against registered customer accounts. Where appropriate, transit payment platform host 1140 may forward the single-ride transaction data to an acquirer 1170 for further processing. Transit payment platform host 1140 generates and maintains the negative file, which is distributed to turnstiles 1130, for example, via terminal controller 150.

Another exemplary AFC architecture—"Host plus Distributed Entitlements," is also based on the use of standard PayPass cards. In this architecture, Transit payment platform host 1140 distributes a positive file of entitlements to turnstiles 1130 in the transit system. The entitlements may be represented as a list of valid unlimited ride cards, and valid value based cards that have a positive pre-funded balance. When a customer presents a standard PayPass card 1110 to turnstile 1130/reader 1132 for fare collection, turnstile 1130 validates the card data and checks whether the card is listed in the entitlement file. If the card is listed in the entitlement file, turnstile 1130 activates a gate to allow the customer access to the gated pay areas of the transit system. Conversely, if the card is not listed in the entitlement file, turnstile 1130 denies the customer access to the gated pay areas of the transit system. Turnstile 1130 may concurrently or later forward a raw transaction data record associated with the card to the transit payment platform host 1140. Transit payment platform host 1140 processes transactions and updates entitlement file and balances for distribution back to turnstiles 1130.

The Host plus Distributed Entitlements architecture may advantageously reduce incidents of unpaid rides that are possible with the Host plus Negative File architecture. However, the entitlement files used in the former architecture may be large. The large entitlement files may require provision of additional memory at turnstiles 1130/terminal controller 1150 in comparison to the memory required for the smaller negative files used in the latter architecture.

Like the Host plus Negative File architecture, the Host plus Distributed Entitlements architecture uses standard PayPass cards. There is no need for special transit application to be loaded onto cards.

Yet another exemplary architecture—"Host plus Smart Ticketing Application on PayPass Card," uses standard PayPass cards that are enhanced with a special transit application. The special transit application records real-time rider activity and a shadow pre-funded balance. The card's pre-funded balance/entitlement may be updated by a customer, for example, at an MTA PayPass enabled vending machine. In this architecture, turnstiles 1130/readers 1132 are configured to read and update a rider activity record stored on the card. The records of rider activity may be used to prevent unpaid rides and abuse of unlimited ride tickets. When a customer presents a standard PayPass card 1110 to turnstile 1130/reader 1132 for fare collection, turnstile 1130 validates the card data and checks whether the card is listed in a negative file or an entitlement file. Further, automatic fare collection transaction processing may occur in a manner similar to that in the previously described two AFC architectures.

FIG. 8 shows AFC solution 1200, which is an exemplary implementation of the Host plus Distributed Negative File AFC architecture in a mass transit system. The structural components of this solution include entities such as PayPass issuers 1290, and software and hardware components such as a standard PayPass Card/device 1210, a Gate Reader 1220, Ticket Vending Machine 1230, Bus Fare Box 1240, station controller 1250, a Transit System Host 1260, a Transit Payment platform 1270, PayPass Card issuers 1290, a rePower Host 1280 and electronic payments network (MasterCard Network 1292).

In AFC solution 1200, PayPass Card/device 1210 may be an ISO 14443 smart card or other device (e.g. key fob) containing the MasterCard PayPass application. Gate Reader 1220 may be a conventional turnstile or gate, which is augmented with an ISO 14443 card reader and a PayPass terminal application. Similarly, Bus Fare Box 1240 may be a conventional bus fare box, which is augmented with an ISO 14443 card reader and a PayPass terminal application. Ticket Vending Machine 1230 may be a conventional ticket vending machine, which is similar to those currently deployed by the MTA at subway stations. Station controller 1250 may be a conventional station controller, which is modified to process PayPass transactions and handle the negative file. Transit System Host 1260 may be an existing system host used by the MTA. Transit fare payment transactions may be routed via Host 1260 and Transaction Payment Platform 1270 to MasterCard Network 1292, which is presently deployed to process and route MasterCard transactions in the US and worldwide. Alternatively, the fare payment transactions may be routed to MasterCard Network 1292 via a separate gateway host (e.g., Network Gateway 296). Use of Network Gateway 1296 as an alternate to route fare payment transactions may minimize the processing load or impact on the existing system host used by the MTA.

MasterCard Network 1292 links Transit Payment Platform 1270, optional rePower Host 1280, PayPass Issuers 1290 and PayPass Merchant PoS 1294. PayPass Issuers 1290 may be conventional issuers of PayPass credit or debit cards (e.g., MasterCard member banks). In FIG. 8, PayPass Merchant PoS 1294 represents the point of sale infrastructure outside the MTA for merchant acceptance of MasterCard PayPass credit and debit cards (e.g. for conducting retail merchant-customer sales). Transit Payment Platform 1270 may be a host system, which is suitably configured to manage single-ride, pay-per-ride and unlimited ride transactions for the MTA/NY Transit and other transit systems (e.g., transit systems 1298). Transit Payment Platform 1270 receives raw transactions from the MTA Transit System Host 1260 or alternate network gateway 1296, and processes the raw transactions against registered cardholder accounts. Transit Payment Platform 1270 may forward single-ride transactions to a third party (e.g., an acquirer) where appropriate. Further, Transit Payment Platform 1270 generates or maintains a negative file, which is passed back to the MTA Transit System Host 1260 for distribution to station controllers 1250.

Optional rePower Host 1280 may be any host system that is configured to reload value based and time based (pre-funded) card accounts automatically or in response to requests. rePower is MasterCard's branded facility for loading value to pre-funded accounts. The rePower host may have suitable interfaces that facilitate reload requests, for example, via the Internet, text message, or telephone. rePower Host 1280 provides updated reload information to linked Transit Payment Platform 1270. When a customer presents PayPass Card/device 1210 for fare payment, solution 1200 may use an exemplary PayPass transit card processing procedure 1300 for AFC according to the fare type (e.g., single ride, value based pay-per-ride, or time based). Exemplary process steps and outcomes that take place at Gate Reader 1220 and/or at Transit Payment Platform 1270 are listed in Table 1 (reproduced in FIGS. 12A and B).

As shown in Table 1, PayPass transit card processing procedure 1300 includes checks on the usage of PayPass cards at two stages. First, the presented card is checked against a negative file at gate 1220 (step 1312). Next, the presented card checked at Transit Payment Platform 1320 (payment authorization steps 1322a, 1323a, and ride entitlement check step 1324a). If either check fails, the card may be added to the negative file.

The Transit Payment Platform checks may be performed asynchronously (i.e. at a later time than card presentment). Therefore, it may be possible for a cardholder whose card clears the first "gate" check to gain access to gated pay areas of the transit system even if the later Transit Payment Platform check fails.

In addition to verifying that the presented card is not present in the negative file, the gate check performed at gate 1220 (step 1312) may include verification that format of the card data is correct, and that the card has not expired. The gate check also may include other verifications, for example, velocity profiling (i.e. that the presented card has not been used more than a fixed number of times in the same day at the same transit station). Similarly, the Transit Payment Platform check may include verification that the presented card has not expired and is not on a list of cards reported as lost or stolen. For MTA Private Label cards that are reported as lost or stolen to a transit service agent, the service agent may update a Transit Payment Platform list of cards reported as lost or stolen. For MasterCard branded cards, Transit Payment Platform 1270 may have access to MasterCard's global lost/stolen cards file and use that file for verification that the presented card has not reported as lost or stolen.

Transit Payment Platform 1270 may be configured to conduct additional checks the transaction data records in order to implement the fare plan rules (e.g., rules concerning transfers between routes/lines). Where appropriate for the implementing such rules, Transit Payment Platform 1270 may generate additional payment transactions. The checks designed to implement fare rules may depend on the type of the fare transaction. For example, for single ride transactions the additional checks may include verification that a maximum number of rides per month has not been exceeded (e.g., 10), and that the payment is authorized by the card issuer. For pay-per-ride transactions, the additional checks may include verification that the cardholder's pre-funded transit account balance is sufficient to fund the ride. For unlimited ride transactions, the additional checks may include verification that the cardholder's unlimited travel period has not expired and that the card has not been presented more than once at the same station within a restricted period (e.g., currently 18 minutes for an MTA MetroCard, which uses magnetic stripe technology).

AFC solution 1200 relies on a hot list of cards (i.e., the negative file) to prevent cardholders from improperly gaining access to the system. If a card is included within the negative file, the gate to pay areas of the transit system will not open. In practice, the effectiveness of this method of preventing improper access depends on the frequency at which the negative file is updated and the distributed throughout the transit system. An updated negative file may be conveniently distributed daily. However, more frequent updates/distribution will likely reduce the incidence of unpaid fare riders.

AFC solution 1200 is also configured to remove or delete card listings from the negative file when appropriate. For example, when a pay-per-ride card is loaded or an unlimited ride card is renewed, any corresponding entry in the negative file is removed. The updated negative file can take effect only after the next distribution of the negative file. In the case of a daily distribution schedule, this may mean that the pay-per-ride/unlimited ride card is valid for travel only on the following day. More frequent updates and distribution of the negative file may be desirable. FIG. 8 shows rePower Host 1280, which is MasterCard's branded facility for loading value to pre-funded transit accounts. A cardholder can register with rePower by filling in a form, via the Internet or as part of a transit account setup procedure. Following registration, the cardholder may top-up his or her pre-funded transit account via the Internet, phone, cell phone text message, e-mail or IVRU. The rePower facility also may be extended to ATMs, PoS devices, machines and possibly to existing ticketing agents.

Solution 1200 may be configured to provide a cardholder with an automatic top-up option, which replenishes value to a pre-funded transit account from an associated debit or credit card when the account balance falls below a certain level. In a transaction for loading value, rePower Host 1280 may first deduct fares for unpaid rides or alternatively add refunds to the designated load amount for the transit account. Further, negative file entries associated with the re-loaded card are deleted.

Similarly, when an unlimited ride ticket is purchased or renewed, any unpaid fares are added to the purchase amount. Further, negative file entries associated with the renewed unlimited ride ticket are deleted.

AFC solution 1200 may affect other conventional aspects of transit system operation. However, AFC solution 1200 may be modified to improve or accommodate the affected aspects. For example, under AFC solution 1200 transit system riders will not have traditional paper tickets, which can be inspected by onboard train conductors. If on-board inspection is desired, solution 1200 may provide portable PayPass Card readers to on-board train conductors or ticket inspectors. The portable PayPass Card readers can be used to inspect PayPass cards presented by on board riders. The portable PayPass Card readers may be provided with mobile communication capabilities so that rider's fare entitlement or payment can be confirmed, for example, with the Transit System Host.

AFC solution 1200 may involve two types of settlement of transactions and payments. One type of settlement relates to single-ride transactions authorized by PayPass Issuers 1290. Settlement for these transactions may be conducted via a third party (e.g., an acquirer, FIG. 7) to Transit Payment Platform and then to the MTA. Alternatively, the single ride transactions settlement may involve transaction aggregation or the use of pre-authorized amounts. Transaction aggregation, which aggregates several single-ride transactions by rider or account-holder, may provide efficient settlement.

A second type of settlement relates to transactions for rides made using pay-per-ride or unlimited ride PayPass cards. This type of settlement is conducted directly between Transit Payment Platform 1270 and the MTA. A suitable commercial arrangement may be set up for this purpose between an operator of Transit Payment Platform 1270 and the MTA.

It will be understood, further, that the foregoing is only illustrative of the principles of the invention, and that various modifications can be made by those skilled in the art, without departing from the scope and spirit of the invention. For example, AFC solution 1200 for MTA NY Transit subways can be readily extended to MTA buses or other modes of transportation. In such extensions, buses or other vehicles or points of access can be equipped with a smart card reader attached to the existing fare box/ticket validator 1240. Transactions would be stored within the equipment and downloaded to the host system when the bus returned to base. Further, for example, the principles of AFC solution are readily extendable to implementations of the Host plus Smart Ticketing Application on PayPass Card architecture and the Host plus Distributed Entitlements architecture, which for brevity are not described in further detail herein.

Figure 9:
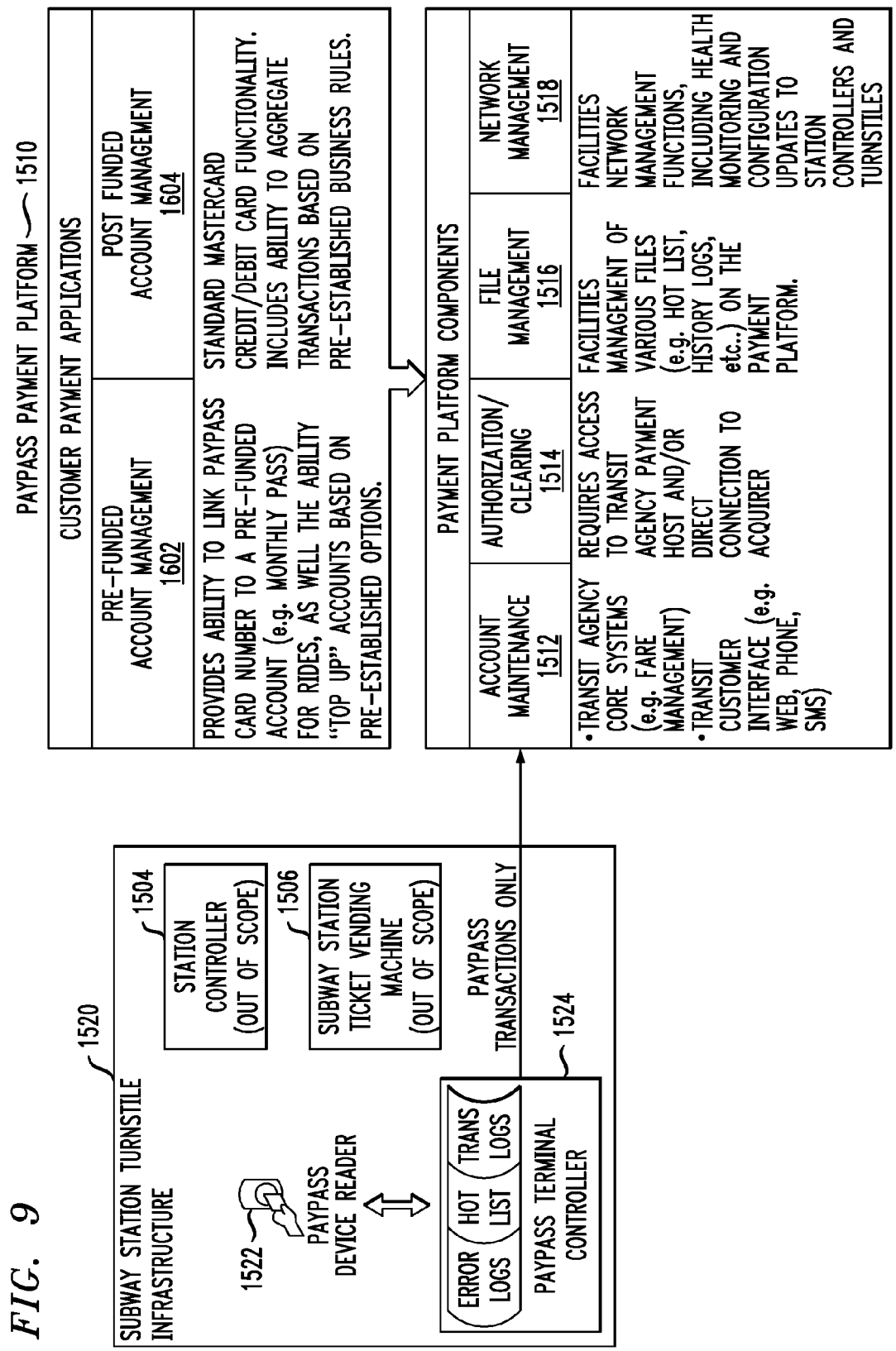

FIG. 9 shows the desired or required functions of the PayPass Transit Payment Platform 1510 and the Subway Turnstile Infrastructure 1520 associated with a demonstration of a PayPass based AFC solution in MTA/NY Transit. Similarly, Appendix C lists the functions and processing steps at each of the key components. Subway Turnstile Infrastructure 1520: All PayPass reader 1522 and terminal 1524 hardware and software preferably comply with published MasterCard PayPass specifications. PayPass readers 1522 and terminals 1524 preferably store and send information securely (e.g., in encrypted format) to prevent unauthorized access to the information. PayPass readers 1522 and terminals 1524 preferably are able to store or log two weeks worth of information in the event of a communications failure. Once these logs (e.g., error and transaction logs) are full, the data may not be overwritten until the logged information is uploaded from terminal 1524. When communicating with the PayPass Transit Payment Platform 1510, PayPass readers 1522 and terminals 1524 preferably provide device health information (e.g. that the device functioning correctly).

PayPass Transit Payment Platform 1510: PayPass Transit Payment Platform 1510 processes only PayPass transactions for turnstile access. All existing turnstile access legacy functions may continue to utilize existing transit agency infrastructure (e.g., station controller 1504, ticket vending machine 1506). PayPass Transit Payment Platform 1510 has applications for management of activities associated with PayPass transactions. These applications may include customer account management 1602 and 1604, account maintenance 1512, payment-processing 1516, file management 1516, and network management 1518 applications. PayPass Transit Payment Platform 1510 may interact with MTA systems in support of processing PayPass transactions. PayPass Transit Payment Platform 1510 may have appropriate management reporting functions for reporting daily activity (e.g.: authorizations obtained, transactions settled for funding, turnstile activity, etc.) to MTA.

Figure 10:
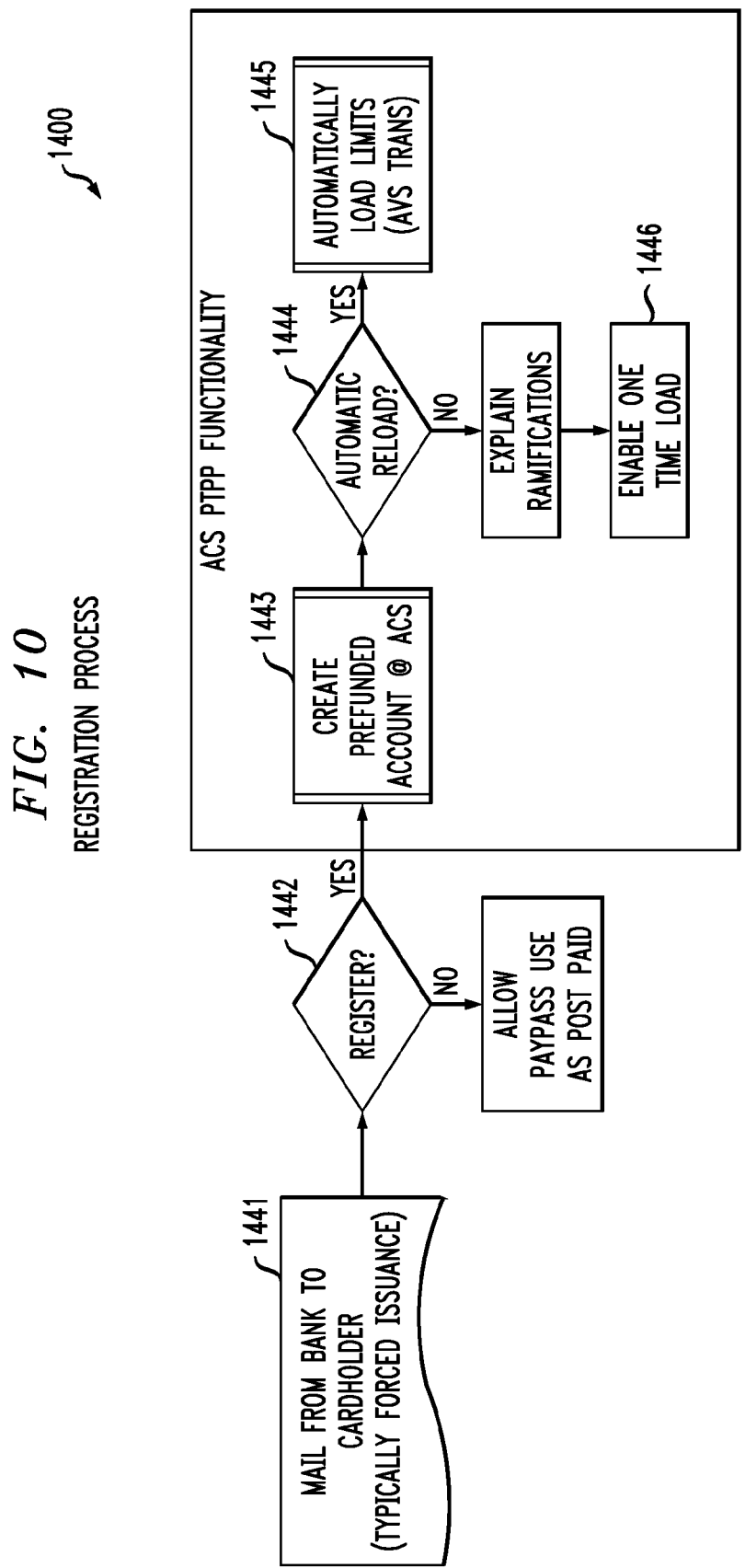

PayPass Transit Payment Platform 1510 has customer account management applications 1602 and 1604 for managing pre-funded and post-funded customer accounts, respectively. Transactions on the two types of account have different payment processing flows (i.e. transaction authorization and clearing flows). PayPass Transit Payment Platform 1510 preferably has the ability to link a PayPass card number to a pre-funded account for admittance through the turnstiles (pre-registration). Funding options may include auto loading, cardholder requested website reloads, SMS, etc. Further, PayPass Transit Payment Platform 1510 preferably has a mechanism for cardholders to establish and maintain their pre-funded accounts. PayPass Transit Payment Platform 1510 may provide a web based customer interface to allow cardholders to obtain ride history relating to aggregated post-funded transactions and/or pre-funded transactions, and transaction history associated with pre-funded account "top-up" activity. The web based customer interface also may allow cardholders to enroll and un-enroll for pre-funded accounts. FIG. 10 shows a process 1400 by which a customer who is mailed a PayPass card by an issuing bank can pre-register the PayPass card for use on a transit system, and link the card to a pre-funded transit account. At step 1441 of process 1400, the bank mails the PayPass card to the cardholder. At step 1442, the cardholder may elect to register the card with the transit system. If the cardholder does not elect to register the card, the cardholder can still use the card for post-paid fare transactions on the transit system. If the cardholder elects to register the card, PayPass Transit Payment Platform 1510 at step 1443 sets up a pre-funded account associated with the card at an Automated Credit Service (ACS). The cardholder may further choose at step 1444 to activate automatic reload features for the pre-funded account. If the cardholder does not choose to activate automatic reload, a pre-funded account is assigned a onetime value (step 1446). Conversely, if the cardholder chooses to activate automatic reload features, account load limits are set up for automatic reloading at step 1445. Step 1445 may utilize a conventional address verification service (AVS) to check cardholder qualifications. The issuing bank may be notified if for three consecutive enrollment attempts the AVS check fails. However, the failing card may not be automatically hot listed. The issuing bank will have the necessary information and may choose to either hot list the card or allow the AVS checking parameters to be reset.

When pre-registering a card, PayPass Transit Payment Platform 1510 may have access to the transit agency's fare rules (see e.g., Appendix A) allowing cardholders the choice of transit agency defined fare options (i.e. discount bulk purchase, buy 5 get one free, etc.). PayPass Transit Payment Platform 1510 preferably has the ability to perform authorization and clearing functions related to "top-up" activity for pre-funded accounts. The transit agency may be the merchant for these transactions and the existing merchant/acquirer relationships that are already in place can be utilized. PayPass Transit Payment Platform 1510 may maintain and manage the balance for all pre-funded accounts. If a pre-registered card account balance is depleted and not reloaded, the card will be added to the negative file. A cancellation facility may be provided for cardholders who may decide that they no longer wish to use the pre-funded functionality but would rather use the post-funded functionality. If the auto load function has been set up previously, the cardholder may be given the choice of canceling only the auto load function or both the auto load function and the pre-funded account itself. Pre-funded accounts may allow "pass back", for up to six (6) rides in 18 minutes. Once a pre-funded PayPass device is reported lost, the cardholder may be able to get any remaining value transferred to a new PayPass account. For post-funded accounts, PayPass Transit Payment Platform 1510 preferably has the ability to aggregate payment card transactions for clearing and authorization at a later time based on a set of pre-defined business rules. For the demonstration project, MasterCard, the transit agency and the card issuer may jointly define the rules. Post-funded accounts may allow "pass back", for up to six (6) rides in 18 minutes.

The authorization procedures for post-funded transactions may be as follows:

At the beginning of any transaction, PayPass Transit Payment Platform 1510 may check if the card used at a turnstile has a pre-funded account already set up, if no pre-funded account is found the transaction may be considered post-funded; and For the first post-funded transaction, PayPass Transit Payment Platform 1510 may perform an authorization. This authorization may be for the amount described in the aggregation business rules below. If the issuer declines this authorization request, the account may be added to the negative file.

Once this authorization is obtained, the card can be used in the transit system according to suitable business rules.

A suitable business rule for aggregation of post-funded transactions requires the aggregated transaction amounts to be sent for clearing when any of the following conditions are met or exceeded:

(1) 10 rides have been taken, (2) a maximum of one half of a month has passed since the first ride. On the 1 st and 15th of the month, the post paid accumulated accounts that have been open for at least 2 weeks may be posted.

(3) the card is hot listed after a transaction has been accepted but prior to the aggregated amount being sent for authorization.

These conditions are parameter based. The parameters may be set through PayPass Transit Payment Platform 1510 and downloaded to the PayPass reader/terminal. After any one of the aggregation business rule conditions have been met, PayPass Transit Payment Platform 1510 may create a clearing transaction. For the next (post settlement) use of the card, PayPass Transit Payment Platform 1510 may treat the card as unknown and process an authorization request. PayPass Transit Payment Platform 1510 preferably has access to a network for performing authorization and clearing functions. It is assumed that the transit agency is the merchant for these transactions and that existing merchant/acquirer relationships are already in place. PayPass Transit Payment Platform 1510 preferably may provide an audit trail of all transactions and interactions occurring on the platform and at the turnstiles. This data may be exportable to the designated support systems and file formats.

PayPass Transit Payment Platform 1510 maintains and manages the positive (entitlement) and negative files. The negative file is used to list hot cards (e.g., lost, stolen, and "Never Received in Issuance" (NRI) cards). The negative file is downloaded to terminals 1524 on a regular basis, preferably as frequently as every four hours. PayPass Transit Payment Platform 1510 may update the negative file multiple times per day based upon a data feed from the card issuer, a data feed from MasterCard, and/or PayPass Transit Payment Platform activity (e.g., a card that has depleted all of its pre-funded account balance may be added to the negative file). Cards may be taken off the hot list when a request is made by the issuer bank to remove a card from the hot list (e.g., when a customer in arrears, who was previously added to the hot list, pays their bill), or when a depleted pre-funded account is funded again.

PayPass Transit Payment Platform 1510 and the terminal systems may maintain a velocity file to track usage of the PayPass devices. This velocity file may be sent to the transit agency multiple times during the day. The PayPass Transit Payment Platform may be required to communicate with the terminals, e.g., over a dial up phone line provided and maintained by the MTA.

FIG. 11 shows the exemplary steps involved in the AFC process 1700 when a customer presents a PayPass card for fare payment at a transit system's card reader. At step 1771, the card's bank identification number (BIN) is checked. If the BIN is in range, at step 1772 the card is checked against the hot list. If the result of the checks at either step 1771 and 1772 are unfavorable, the transaction is declined (step 1773). If the result of the checks at steps 1771 and 1772 are favorable, a transaction is posted (step 1774) and sent to the PayPass Transit Payment Platform for processing (step 1775). The PayPass Transit Payment Platform, at step 1776 determines if there is a pre-funded account associated with the card. In case there is a pre-funded account, the PayPass Transit Payment Platform at step 1777 performs pre-funded account activity. In case there is no pre-funded account associated with the card, the PayPass Transit Payment Platform at step 1778 determines if there is an accumulation or aggregation account associated with the card. In case there is no accumulation account associated with the card, the PayPass Transit Payment Platform at step 1779 sets up an accumulation account associated with the card. In case there is an accumulation account associated with the card, the PayPass Transit Payment Platform at step 1780 accumulates the transaction to the accumulation account. Lastly the PayPass Transit Payment Platform step 1781 prepares an accounting/clearing record for aggregation when a business rule condition is triggered.

In accordance with the present invention, software (i.e., instructions) for implementing the aforementioned AFC solutions can be provided on computer-readable media. It will be appreciated that each of the steps (described above in accordance with this invention), and any combination of these steps, can be implemented by computer program instructions. These computer program instructions can be loaded onto a computer or other programmable apparatus to produce a machine, such that the instructions, which execute on the computer or other programmable apparatus, create means for implementing the functions of the aforementioned AFC solutions. These computer program instructions can also be stored in a computer-readable memory that can direct a computer or other programmable apparatus to function in a particular manner, such that the instructions stored in the computer-readable memory produce an article of manufacture including instruction means which implement the functions of the aforementioned AFC solutions. The computer program instructions can also be loaded onto a computer or other programmable apparatus to cause a series of operational steps to be performed on the computer or other programmable apparatus to produce a computer implemented process such that the instructions which execute on the computer or other programmable apparatus provide steps for implementing the functions of the aforementioned AFC solutions. It will also be understood that the computer-readable media on which instructions for implementing the aforementioned AFC solutions are be provided, include without limitation, firmware, micro controllers, microprocessors, integrated circuits, ASICS, and other available media.

Appendix a MTA Fare Structure
   Single-ride—Full Fare—$2
   Single-ride—Reduced Fare—$1
   Pay-per-ride MetroCard (pre-funded journeys at either Full or Reduced Fare)
     Buy as many rides as you want from $4 to $80
     Put $10 or more on your card and receive a 20 percent bonus
     Automatic free transfer between subway and bus, or between buses
     (no transfers from subway to subway or to the bus route on which you started)
     (refill as often as you like, until card expires)
     (can be used to pay for up to 4 people at a time)
   Unlimited Ride MetroCard (pre-funded, unlimited journeys in a given time period)
     1-Day Fun Pass
     7-Day
     30-Day
     7-Day Express Bus Plus
     30-Day Unlimited Ride (JKF AirTrain Only)
     (no refills—purchase a new card for each new period)
     (cannot be used at the same subway station or on the same bus route for 18 minutes)
     (can only be used by one person at a time).

APPENDIX B Table—Possible Types of Card and Transit Payments Supported—Presented in FIG. 13

Appendix C. Functions/Processing of Key Components
This appendix is a non-exhaustive, illustrative list of the processing impacts on key system components.

Gate Processing
   read card (PAN+Expiry Date+CVC)
   verify card (local)
     PAN checksum OK
     check expiry date not exceeded
     check card data against local negative file
   IF verification OK THEN open gate
   Format transaction record
     Station+Gate+Card Data+Transaction Type (entry only)+Date/Time Stamp Station Controller Processing
   Receive Negative File
   Respond to negative file enquiries
   Store and Forward Transaction Records
     Route PayPass Transaction to New Transit Payment Platform
     Route existing MetroCards Transactions to current Cubic platform Transit Payment Platform Processing
   Table Maintenance
     Fares
     Active stations
     Gates within system—by fare control area
     Card Types
       Fare Plan
       Travel Rules
   Register Card+Fare Plan
   Card Account/Entitlement
   Cardholder inquiry on account information
   Update Fare Plan
   Block Card (e.g.: lost/stolen)
   Negative File Maintenance
     Add new entries
     Cleanup entries
   Distribute Negative File
   Receive/Validate Transaction Batch
     Validate Batch
     Validate Transactions
     Sort (PAN, Date/Time, Station/Gate)
   Process Transaction Batch (note 1)
     Create Journey Transactions & Calculate Journey Fare (Handle Exceptions)
     Process pay-per-ride transactions
     Process unlimited ride transactions
     Process single ride transactions
     (Question if there is more than one credit/debit journey could aggregate?)
   Process reloads from rePower
   Acquirer Interface (for debit/credit transactions)
   Risk Management/Fraud Detection
   Settlement
     With MTA
     With Acquirer
     With rePower
   Customer service

What is claimed is:

1. A method for authorization of usage of a payment device at a merchant, said payment device having an associated account number and being issued by an issuer coupled to a payment processing network, said method comprising the steps of:

facilitating obtaining said account number in connection with a putative transaction with a terminal of said merchant;

facilitating determining whether said account number is in an active file of said merchant which indicates whether said account number is known to said merchant, using an apparatus intermediate said terminal and said payment processing network;

responsive to said determining step indicating that said account number is not in said active file of said merchant, such that said account number is not known to said merchant;

facilitating said issuer obtaining an authorization message, through said payment processing network, for said account number;

facilitating obtaining an issuer authorization decision;

facilitating checking, using said apparatus, whether said account number is ineligible for said putative transaction, without use of said issuer authorization decision;

responsive to said checking indicating that said account number is not ineligible for said putative transaction, approving said putative transaction, with said apparatus, without use of said issuer authorization decision;

responsive to said issuer authorization decision, facilitating setting a spending limit for said account number;

facilitating conducting subsequent putative transactions for said account number;

facilitating determining that a parameter associated with said account number is reaching a predetermined relationship with said spending limit; and responsive to said determining that said parameter is reaching said predetermined relationship, facilitating obtaining a new issuer authorization decision to adjust a spendable balance associated with said account number.

2. The method of claim 1, wherein:
   said spending limit comprises an aggregation limit specifying at least one of:

a maximum amount of spending before said new issuer authorization decision is required, a maximum number of presentations of said payment device to said merchant before said new issuer authorization decision is required, and a maximum amount of time before said new issuer authorization decision is required; and said payment device is post-funded in that a financial authorization, clearing, and settlement for said subsequent putative transactions is only conducted once it is determined that said parameter associated with said account is reaching said predetermined relationship with said aggregation limit.

3. The method of claim 2, wherein said aggregation limit varies based on at least one of (i) brand of said payment device, and (ii) type of product of said payment device within a given brand.

4. The method of claim 1, further comprising the additional step of:

responsive to said determining step indicating that said account number is not in said active file of said merchant, setting a flag to indicate that said account number is not in said active file of said merchant.

5. The method of claim 4, wherein said checking, using said apparatus, whether said account number is ineligible for said putative transaction, without use of said issuer authorization decision, comprises accessing, via said apparatus, a file structure comprising at least negative account status information for a plurality of accounts, wherein said checking indicating that said account number is not ineligible for said putative transaction comprises a determination that said account number does not exhibit said negative account status information.

6. The method of claim 5, wherein said file structure comprises a constructed file and said merchant comprises a transit authority, said constructed file in turn comprising at least data associated with a first payment network and data associated with said transit authority, said data associated with said first payment network comprising at least a portion of said negative account status information for said plurality of said accounts, said data associated with said transit authority comprising at least a portion of said active file.

7. The method of claim 1, further comprising the additional step of facilitating inclusion of said putative transactions in a data warehouse, for subsequent usage by at least one of: (i) said issuer of said device, (ii) said merchant, (iii) a merchant acquirer or merchant payment service provider, and (iv) another merchant.

8. The method of claim 1, wherein said step of facilitating conducting said subsequent putative transactions for said account number comprises facilitating approval of given ones of said subsequent putative transactions, where appropriate, by (i) determining whether an account associated with said account number exhibits a limiting condition, and (ii) responsive to determining that said account does not exhibit said limiting condition, facilitating said approval of said given one of said subsequent putative transactions and a balance aggregation, further comprising the additional step of facilitating substantially parallel sending of a response to an acquiring entity associated with a corresponding one of said subsequent putative transactions.

9. The method of claim 1, wherein said account number is a first account number and said payment device is a first payment device, further comprising:

facilitating obtaining a second account number of a second payment device in connection with another putative transaction with a terminal of said merchant;

facilitating determining whether said second account number is in said active file of said merchant which indicates whether said second account number is known to said merchant, using said apparatus;

responsive to said determining step indicating that said second account number is not in said active file of said merchant, such that said second account number is not known to said merchant:

facilitating an issuer of said second device obtaining an authorization message, through said payment processing network, for said second account number;

facilitating obtaining an issuer authorization decision from said issuer of said second payment device;

facilitating checking, using said apparatus, whether said second account number is ineligible for said putative transaction, without use of said issuer authorization decision from said issuer of said second payment device;

responsive to said checking indicating that said second account number is not ineligible for said putative transaction, approving said another putative transaction, with said apparatus, without use of said issuer authorization decision from said issuer of said second payment device; and responsive to said issuer authorization decision from said issuer of said second payment device, facilitating setting a spending limit for said second account number;

wherein:

said issuer authorization decision from said issuer of said second payment device is negative, said spending limit for said second account number is set to one of zero and a negative number, and said merchant carries a risk of loss of value of said another putative transaction.

10. The method of claim 1, wherein said account number is a first account number and said payment device is a first payment device, further comprising:

facilitating obtaining a second account number of a second payment device in connection with another putative transaction with a terminal of said merchant;

facilitating determining whether said second account number is in said active file of said merchant which indicates whether said second account number is known to said merchant, using said apparatus;

responsive to said determining step indicating that said second account number is not in said active file of said merchant, such that said second account number is not known to said merchant:

facilitating an issuer of said second device obtaining an authorization message, through said payment processing network, for said second account number;

facilitating obtaining an issuer authorization decision from said issuer of said second payment device;

facilitating checking, using said apparatus, whether said second account number is ineligible for said putative transaction, without use of said issuer authorization decision from said issuer of said second payment device;

responsive to said checking indicating that said second account number is not ineligible for said putative transaction, approving said another putative transaction, with said apparatus, without use of said issuer authorization decision from said issuer of said second payment device; and responsive to said issuer authorization decision from said issuer of said second payment device, facilitating setting a spending limit for said second account number;

wherein:

said issuer authorization decision from said issuer of said second payment device is negative, said spending limit for said second account number is set to a positive number, and said merchant carries a risk of loss of value of said another putative transaction;

further comprising the additional step of flagging said second account number with a negative status.

11. The method of claim 1, further comprising adding said account number to said active file of said merchant when said payment device is first used at said merchant.

12. An apparatus for authorization of usage of a payment device at a merchant, the payment device having an associated account number and being issued by an issuer coupled to a payment processing network, said apparatus comprising:

a memory; and at least one processor coupled to said memory, said at least one processor being operative to:

facilitate obtaining said account number in connection with a putative transaction with a terminal of said merchant, said apparatus being intermediate said terminal and said payment processing network;

facilitate determining whether said account number is in an active file of said merchant which indicates whether said account number is known to said merchant, said active file being stored in said memory;

responsive to said determining step indicating that said account number is not in said active file of said merchant, such that said account number is not known to said merchant:

facilitate said issuer obtaining an authorization message, through the payment processing network, for the account number;

facilitate obtaining an issuer authorization decision;

facilitate checking whether said account number is ineligible for said putative transaction, without use of said issuer authorization decision;

responsive to said checking indicating that said account number is not ineligible for said putative transaction, approve said putative transaction without use of said issuer authorization decision;

responsive to said issuer authorization decision, facilitate setting a spending limit for the account number;

facilitate conducting subsequent putative transactions for said account number;

facilitate determining that a parameter associated with said account number is reaching a predetermined relationship with said spending limit; and responsive to said determining that said parameter is reaching said predetermined relationship, facilitate obtaining a new issuer authorization decision to adjust a spendable balance associated with said account number.

13. The apparatus of claim 12, wherein:

said spending limit comprises an aggregation limit specifying at least one of:

a maximum amount of spending before said new issuer authorization decision is required, a maximum number of presentations of said payment device to said merchant before said new issuer authorization decision is required, and a maximum amount of time before said new issuer authorization decision is required; and the payment device is post-funded in that a financial authorization, clearing, and settlement for said subsequent putative transactions is only conducted once it is determined that said parameter associated with said account is reaching said predetermined relationship with said aggregation limit; and said active file comprises account numbers including said associated account number and said at least one processor is further operative to:

receive a periodic update file from a payment processing network operator based on information from the issuer; and delete those of said account numbers in said active file that have not been used within a predetermined time period.

14. The apparatus of claim 12, wherein said at least one processor is further operative to add said account number to said active file of said merchant when the payment device is first used at the merchant.

15. An apparatus for authorization of usage of a payment device in a transit system, the payment device having an associated account number and being issued by an issuer coupled to a payment processing network, said apparatus comprising:

a fare gate assembly adapted to read the payment device;

a payment platform module in communication with said fare gate assembly; and an active file manager in communication with said payment platform module, wherein said payment platform module and said active file manager are cooperatively configured to:

facilitate obtaining said account number in connection with a putative transaction with a terminal of said merchant, said apparatus being intermediate the terminal and the payment processing network;

facilitate determining whether said account number is in an active file of the merchant which indicates whether said account number is known to the merchant, said active file being stored in association with said active file manager;

responsive to said determining step indicating that said account number is not in said active file of the merchant, such that said account number is not known to the merchant;

facilitate the issuer obtaining an authorization message, through the payment processing network, for the account number;

facilitate obtaining an issuer authorization decision;

facilitate checking whether said account number is ineligible for said putative transaction, without use of said issuer authorization decision;

responsive to said checking indicating that said account number is not ineligible for said putative transaction, approve said putative transaction without use of said issuer authorization decision;

responsive to said issuer authorization decision, facilitate setting a spending limit for the account number;

facilitate conducting subsequent putative transactions for said account number;

facilitate determining that a parameter associated with said account number is reaching a predetermined relationship with said spending limit; and responsive to said determining that said parameter is reaching said predetermined relationship, facilitate obtaining a new issuer authorization decision to adjust a spendable balance associated with said account number.

16. The apparatus of claim 15, wherein said active file manager is further configured to determine whether a user of the device shall have access to the transit system via said fare gate assembly, said access comprising said putative transaction.

17. The apparatus of claim 16, wherein said payment platform module is further configured to maintain at least some records associated with said account number.

18. The apparatus of claim 17, wherein said fare gate assembly, said payment platform module, and said active file manager are cooperatively configured to update said records associated with said account number at least in real time based on quality of service prioritizations.

19. The apparatus of claim 15, wherein at least one of said active file manager, said fare gate assembly, and said payment platform module is further configured to provide stand-in functionality in case of an upstream malfunction.

20. The apparatus of claim 19, wherein said active file manager comprises a primary active file manager and said payment platform comprises a primary payment platform, further comprising a secondary active file manager and a secondary payment platform, operatively configured for backing up said primary active file manager and said primary payment platform, respectively.

21. The apparatus of claim 15, wherein:
said spending limit comprises an aggregation limit specifying at least one of:
a maximum amount of spending before said new issuer authorization decision is required,
a maximum number of presentations of said payment device to said merchant before said new issuer authorization decision is required, and
a maximum amount of time before said new issuer authorization decision is required; and
the payment device is post-funded in that a financial authorization, clearing, and settlement for said subsequent putative transactions is only conducted once it is determined that said parameter associated with said account is reaching said predetermined relationship with said aggregation limit.

22. The apparatus of claim 15, wherein said payment platform module and said active file manager are further cooperatively configured to add said account number to said active file of said merchant when the payment device is first used at the merchant wherein said account number is not located in said active file of said merchant prior to said first use at said merchant.

23. A method for authorization of usage of a payment device at a merchant, said payment device having an associated account number and being issued by an issuer coupled to a payment processing network, said method comprising the steps of:
facilitating obtaining said account number in connection with a putative transaction with a terminal of said merchant:
facilitating determining whether said account number is in an active file of said merchant, using an apparatus intermediate said terminal and said payment processing network;
responsive to said determining step indicating that said account number is not in said active file of said merchant:
facilitating said issuer obtaining an authorization message for a nominal amount, to validate to said merchant an account associated with said account number of said payment device, said issuer obtaining said authorization message through said payment processing network, for said account number;
facilitating obtaining an issuer authorization decision;
approving said putative transaction, with said apparatus, without use of said issuer authorization decision;
responsive to said issuer authorization decision, facilitating setting a spending limit for said account number;
facilitating conducting subsequent putative transactions for said account number;
facilitating determining that a parameter associated with said account number is reaching a predetermined relationship with said spending limit; and
responsive to said determining that said parameter is reaching said predetermined relationship, facilitating obtaining a new issuer authorization decision to adjust a spendable balance associated with said account number;
wherein:
said spending limit comprises an aggregation limit specifying at least one of:
a maximum amount of spending before said new issuer authorization decision is required,
a maximum number of presentations of said payment device to said merchant before said new issuer authorization decision is required, and
a maximum amount of time before said new issuer authorization decision is required; and
said payment device is post-funded in that a financial authorization, clearing, and settlement for said subsequent putative transactions is only conducted once it is determined that said parameter associated with said account is reaching said predetermined relationship with said aggregation limit.

24. An apparatus for authorization of usage of a payment device at a merchant, the payment device having an associated account number and being issued by an issuer coupled to a payment processing network, said apparatus comprising:
a memory; and
at least one processor coupled to said memory, said at least one processor being operative to:
facilitate obtaining said account number in connection with a putative transaction with a terminal of said merchant, said apparatus being intermediate said terminal and said payment processing network;
facilitate determining whether said account number is in an active file of said merchant, said active file being stored in said memory;
responsive to said determining step indicating that said account number is not in said active file of said merchant:
facilitate said issuer obtaining an authorization message for a nominal amount, to validate to said merchant an account associated with said account number of the payment device, said issuer obtaining said authorization message through the payment processing network, for the account number;
facilitate obtaining an issuer authorization decision;
approve said putative transaction without use of said issuer authorization decision;
responsive to said issuer authorization decision, facilitate setting a spending limit for the account number;
facilitate conducting subsequent putative transactions for said account number;

facilitate determining that a parameter associated with said account number is reaching a predetermined relationship with said spending limit; and responsive to said determining that said parameter is reaching said predetermined relationship, facilitate obtaining a new issuer authorization decision to adjust a spendable balance associated with said account number;

wherein:

said spending limit comprises an aggregation limit specifying at least one of:

a maximum amount of spending before said new issuer authorization decision is required, a maximum number of presentations of said payment device to said merchant before said new issuer authorization decision is required, and a maximum amount of time before said new issuer authorization decision is required; and the payment device is post-funded in that a financial authorization, clearing, and settlement for said subsequent putative transactions is only conducted once it is determined that said parameter associated with said account is reaching said predetermined relationship with said aggregation limit.

25. An apparatus for authorization of usage of a payment device in a transit system, the payment device having an associated account number and being issued by an issuer coupled to a payment processing network, said apparatus comprising:

a fare gate assembly adapted to read the payment device;

a payment platform module in communication with said fare gate assembly; and an active file manager in communication with said payment platform module, wherein said payment platform module and said active file manager are cooperatively configured to:

facilitate obtaining said account number in connection with a putative transaction with a terminal of said merchant, said apparatus being intermediate the terminal and the payment processing network;

facilitate determining whether said account number is in an active file of the merchant, said active file being stored in association with said active file manager;

responsive to said determining step indicating that said account number is not in said active file of the merchant:

facilitate the issuer obtaining an authorization message for a nominal amount, to validate to the merchant an account associated with said account number of the payment device, said issuer obtaining said authorization message through the payment processing network, for the account number;

facilitate obtaining an issuer authorization decision;

approve said putative transaction without use of said issuer authorization decision;

responsive to said issuer authorization decision, facilitate setting a spending limit for the account number;

facilitate conducting subsequent putative transactions for said account number;

facilitate determining that a parameter associated with said account number is reaching a predetermined relationship with said spending limit; and responsive to said determining that said parameter is reaching said predetermined relationship, facilitate obtaining a new issuer authorization decision to adjust a spendable balance associated with said account number;

wherein:

said spending limit comprises an aggregation limit specifying at least one of:

a maximum amount of spending before said new issuer authorization decision is required, a maximum number of presentations of said payment device to said merchant before said new issuer authorization decision is required, and a maximum amount of time before said new issuer authorization decision is required; and said payment device is post-funded in that a financial authorization, clearing, and settlement for said subsequent putative transactions is only conducted once it is determined that said parameter associated with said account is reaching said predetermined relationship with said aggregation limit.

* * * * *